United States Patent [19]

Otonari

[11] Patent Number: 5,754,626
[45] Date of Patent: May 19, 1998

[54] DIGITAL RADIOTELEPHONE APPARATUS

[75] Inventor: Miki Otonari, Fukuoka, Japan

[73] Assignee: Matsushita Electric Industrial Co., Ltd., Osaka, Japan

[21] Appl. No.: 450,125

[22] Filed: May 25, 1995

[30] Foreign Application Priority Data

Aug. 9, 1994 [JP] Japan ................... 6-187487

[51] Int. Cl.$^6$ ............... H04M 11/00; H04B 1/00; H04B 7/00
[52] U.S. Cl. ............... 379/61; 379/58; 455/56.1; 455/63; 370/321; 370/442; 375/267
[58] Field of Search ............... 379/61, 60; 455/51.1, 455/52.1, 52.3, 63, 65, 101, 34.1, 34.2, 56.1; 370/95.1, 321, 337, 347, 345, 442, 326, 458; 375/259, 260, 267

[56] References Cited

U.S. PATENT DOCUMENTS

| | | |
|---|---|---|
| 5,260,944 | 11/1993 | Tomabechi ............... 370/95.1 |
| 5,268,933 | 12/1993 | Averbuch ............... 455/101 |
| 5,430,760 | 7/1995 | Dent ............... 375/200 |
| 5,430,761 | 7/1995 | Bruckert et al. ............... 375/200 |
| 5,483,537 | 1/1996 | Dupuy ............... 370/95.3 |
| 5,528,597 | 6/1996 | Gerszberg et al. ............... 370/95.3 |
| 5,537,685 | 7/1996 | Matsuno ............... 455/51.1 |

FOREIGN PATENT DOCUMENTS

0564429A2  6/1993  European Pat. Off. ......... H04Q 7/00

Primary Examiner—Curtis Kuntz
Assistant Examiner—Binh K. Tieu
Attorney, Agent, or Firm—Spencer & Frank

[57] ABSTRACT

A digital radiotelephone apparatus includes a personal station and a base station which communicate with each other by a radio signal using time division multiple access. The base station dynamically changes the transmission timing of control information, which is transmitted to the personal station, in a waiting state of the personal station. The personal station dynamically changes its reception timing of the control information in response to the dynamical change of the transmission timing by the base station.

40 Claims, 28 Drawing Sheets

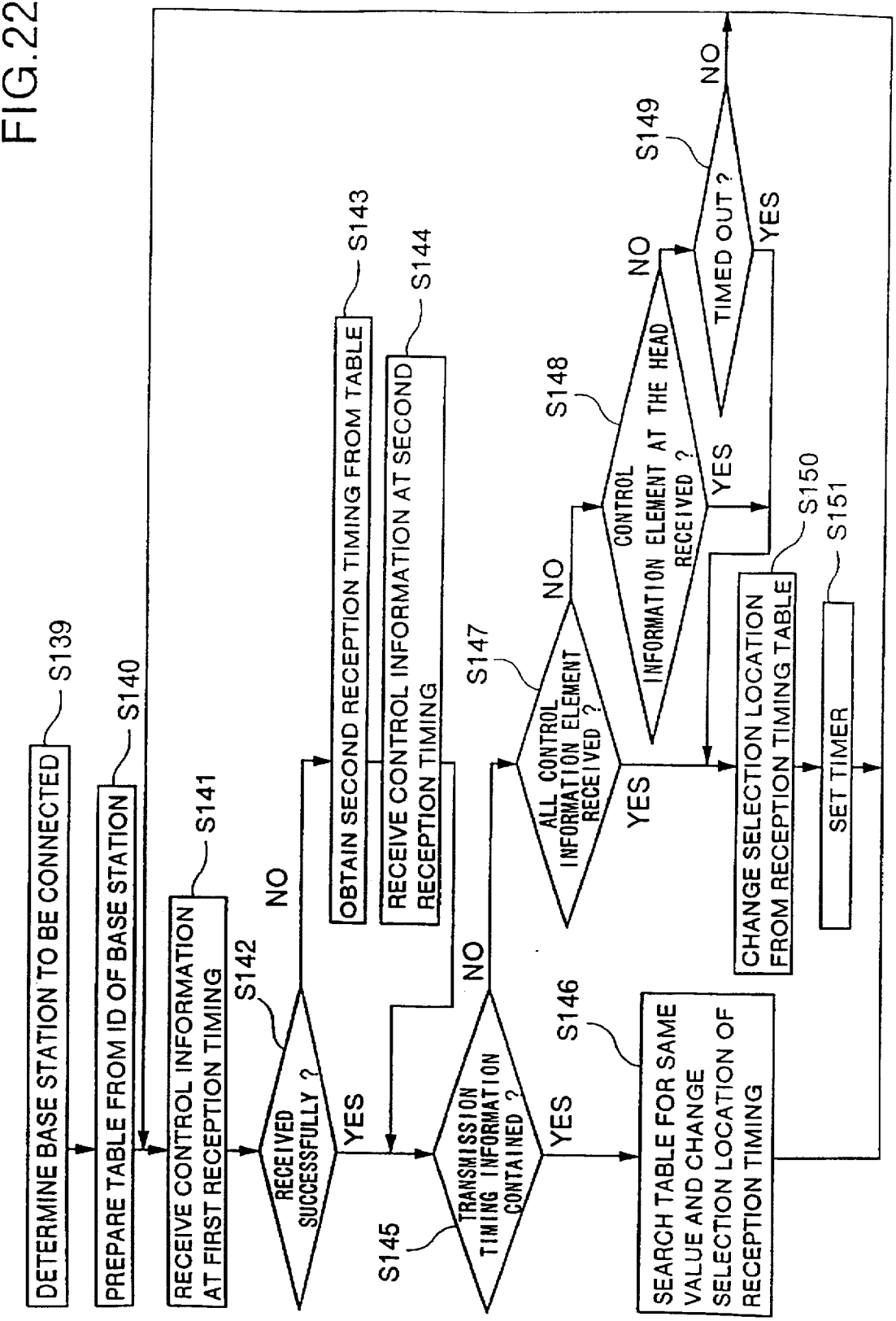

BASE STATION 1410A

FIRST OFFSET A1=10msec
SECOND OFFSET A2=40msec

BASE STATION 1410B

FIRST OFFSET B1=10msec
SECOND OFFSET B2=80msec

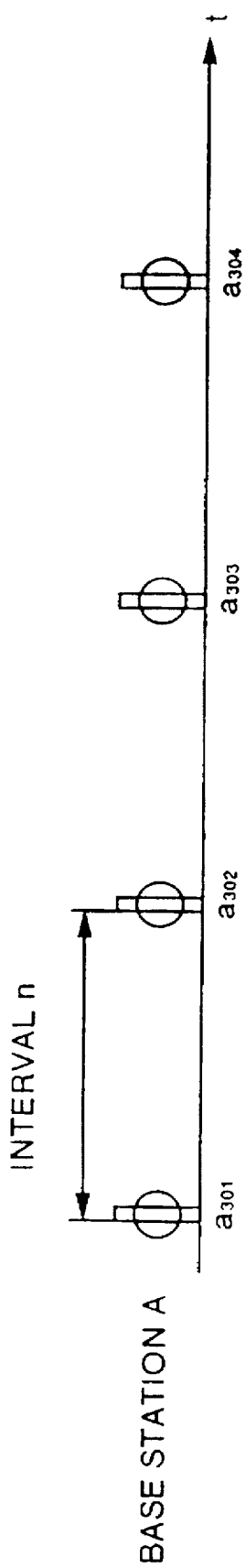
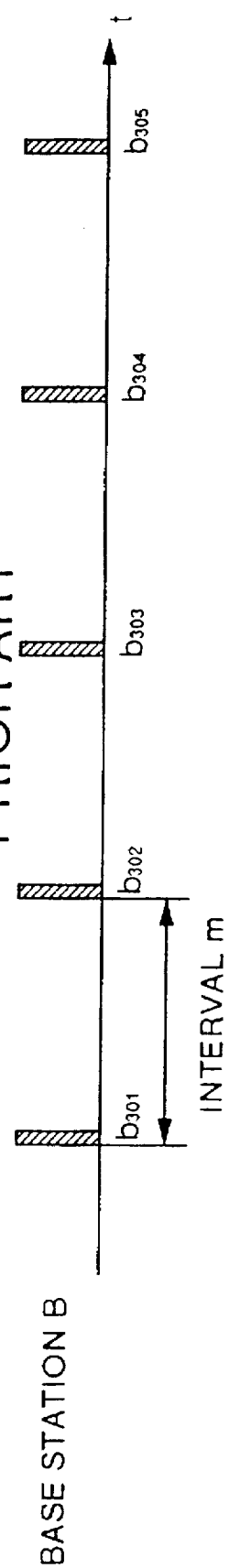

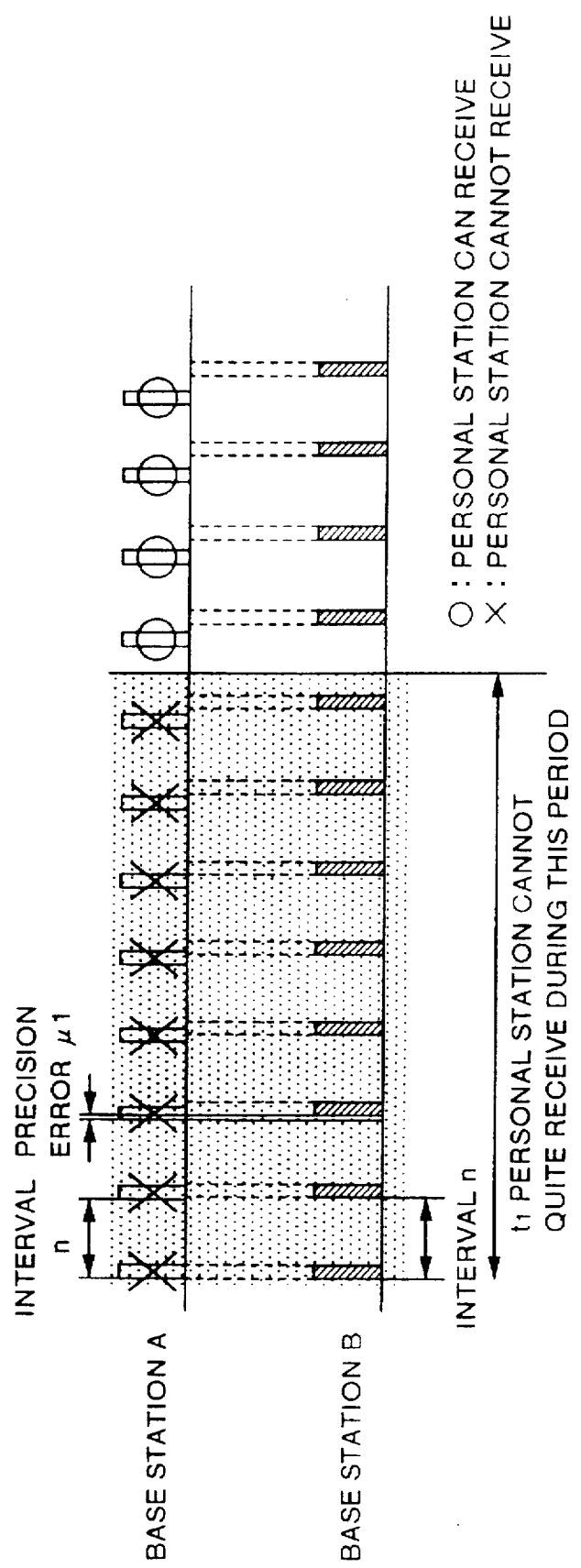

DIGITAL RADIOTELEPHONE APPARATUS

BACKGROUND OF THE INVENTION

The present invention relates to a digital radiotelephone apparatus including a public base station (PBS) used in a cellular system or a domestic base station (DBS) used as a base station of a cordless telephone apparatus in a home and a mobile station or personal station (PS).

Hereinafter, a base station (BS) is a general term for the public base station (PBS) and the domestic base station (DBS).

In the digital radiotelephone apparatus, the personal station always receives control information transmitted from the base station to the personal station in the point-to-multipoint manner to monitor the information from the base station when the personal station is in the waiting state in which the personal station is not in conversation or communication with another station.

Referring now to a flow chart of FIG. 24, operation in the waiting state of a conventional digital radiotelephone apparatus is described.

The personal station first determines the base station from which the control information is received (step S1).

Then, the personal station scans a carrier frequency transmitted by the base station (step S2) to accomplish a logical control channel (LCCH) transmitted by the base station so that the personal station receives the control information (step S3).

When the received control information is not the control information transmitted by the desired base station, the process is returned to step S2 (step S4).

The logical control channel is intermittently transmitted by the base station in the transmission timing of a fixed interval. Accordingly, after accomplish of the logical control channel, the personal station intermittently receives the control information from the base station in the transmission timing (step S5).

However, the logical control channels transmitted by a plurality of base stations are overlapped with each other to interfere with each other, so that the personal station often cannot receive the logical control channel exactly.

A method of avoiding the interference of the logical control channel transmitted by the base station in the conventional digital radiotelephone apparatus is now described.

FIG. 25 is a timing chart showing transmission timings of the logical control channels transmitted by a base station A and a base station B located adjacent to the base station A in the conventional digital radiotelephone apparatus. In FIG. 25, n and m represent transmission intervals of the logical control channels of the base stations A and B, respectively, and the interval n is not equal to the interval m (n≠m). Further, $a_1$ to $a_{18}$ and $b_1$ to $b_{13}$ represent periods that the logical control channels are transmitted by the base stations A and B, respectively, and t represents time.

As apparent from the above configuration, heretofore, the interval of the intermittent transmission by the base station A is set to be different from that by the base station B located adjacent to the base station A. With such an intermittent transmission, for example, when a personal station B receives the logical control channel transmitted by the base station A at intervals of n, the logical control channel transmitted by the base station A is assumed to be interfered with the logical control channel transmitted by the base station B at intervals of m (m≠n) at a certain moment. In this case, even when the personal station cannot receive the logical control channel transmitted by the base station A due to the interference, the interference is not removed at the next receiving timing since the transmission timing of the logical control channel from the base station A is different from that from the base station B. Accordingly, the personal station can receive the logical control channel transmitted at intervals of n by the base station A at the next receiving timing.

In the above-described example in the prior art, the base station A has three interferences at $a_4$ (interference with $b_3$), $a_{11}$ (interference with $b_8$) and $a_{14}$ (interference with $b_{10}$) in 18 times of transmission of $a_1$ to $a_{18}$. If it is assumed that interferences occur when the base stations A and B perform transmission at the same intervals, interferences occur in all transmission operations and accordingly it is understood that influence due to the interferences can be reduced in the above example in the prior art.

Further, another prior art method of avoiding the interference is also considered in addition to the above prior art method.

FIG. 26 is a timing chart showing another example of the interference avoiding method of the logical control channel in a conventional digital radiotelephone apparatus. It is assumed that a base station used in the conventional digital radiotelephone apparatus can perform transmission with a different frequency simultaneously. FIG. 26 shows the transmission state from base station using frequencies f1 and f2 and in FIG. 26, $a_{101}$ to $a_{118}$ represent periods that the logical control channels are transmitted by the base station, n represents a transmission interval of the logical control channel of the base station, and $X_1$ represents an offset value. Further, marks ○ and x described on $a_{101}$ to $a_{118}$ represent that a personal station can receive the logical control channel and a personal station cannot receive the logical control channel due to the influence such as interference or the like, respectively. That is, FIG. 26 shows that the personal station can receive the information at the periods $a_{101}$ to $a_{107}$, $a_{110}$ to $a_{112}$ and $a_{114}$ to $a_{118}$ and the personal station cannot receive the information at the periods $a_{108}$, $a_{109}$ and $a_{113}$ with the frequency f1.

In this prior art, the base station delays the same contents as those transmitted with the frequency f1 by the offset value $X_1$ and transmits the contents with the frequency $f_2$.

The personal station usually receives the information with the frequency f1, while when the personal station cannot receive the information, the personal station changes the frequency for reception to the frequency f2 to thereby receive the information which could not be received.

For example, when the personal station cannot receive the information at the period $a_{108}$ with the frequency f1, the personal station changes the frequency for reception to the frequency f2 to receive the information. After the personal station has received the information, the personal station changes the reception frequency to the frequency f1 again to receive the information at the period $a_{109}$. At this time, when the personal station cannot receive the information at the period $a_{109}$, the personal station changes the reception frequency to the frequency f2 to perform the same operation. Similarly, when the information at the period $a_{113}$ cannot be received with the frequency f1, reception of the information at the period $a_{113}$ is made with the frequency f2.

However, the above prior arts have the following problems.

First of all, in the method in which the interval for the intermittent transmission of the base station is varied in each base station, as shown by the timing chart of FIG. 27, as the interval is smaller, the transmission timings of the logical control channel are apt to overlap with each other, so that the probability that the logical control channels interfere with each other is increased. Accordingly, the interval cannot be made too small. On the contrary, as shown in FIGS. 28A and 28B, when the interval is larger, the information content capable of transferring the logical control channel in a unit time is reduced. Accordingly, the interval cannot be made too large.

Accordingly, there is a problem that the range of the interval value to be able to be set is limited and the effect of avoiding the logical control channels transmitted by the base stations from interfering with each other is scare.

Further, in the above interference avoidance method, as described above, since the range of the usable interval value is limited, when a new base station is installed without considering a surrounding base station located in the vicinity thereof, there is a case where an interval having the same value as that of the surrounding base station is set in the new base station. When such base stations interfere with each other, there is only a method of escaping from the interference state by means of an error $\mu_1$ in accuracy between peculiar clocks of the base stations for producing the respective intervals as shown in FIG. 29. The personal station cannot receive the logical control channel during the interference state (period $t_1$ in FIG. 29). Accordingly, when the new base station is installed, it is necessary to assign an interval to the new base station so that intervals of all base stations considered to interfere with each other are not equal to each other.

In this method, however, it is necessary to control or manage the transmission timings of all of the base stations. Accordingly, since it is necessary to construct a management system, the scale of the whole system becomes large and it is necessary to install a management center which communicates with all of the base stations so as to control not to have the same interval as that of the base station having the possibility of effecting the interference.

Further, a cordless telephone apparatus is introduced and used in a home by the user's own desire and the user does not consider an interval value of an adjacent domestic base station (DBS) upon the introduction of the cordless telephone apparatus. In addition, it is impossible to manage an installation location of the adjacent domestic base station (DBS) and its existence itself. Accordingly, it is impossible to prevent the interference by using the above method. Particularly, since a distance between adjacent homes in an apartment house, that is, a distance between domestic base stations (DBS) is short, the interference possibility is increased.

Accordingly, the above method can be adopted in only a particular system capable of obtaining cooperation with surrounding base stations as in the public base station (PBS) and is difficult to be adopted in a system in which apparatuses are installed in each home and communicate with each other as in the cordless telephone apparatus for use in home.

On the other hand, a method of pluralizing carrier frequencies for the logical control channels transmitted by the base station has a problem that there is a limitation for assignment of the frequencies usable by the radiotelephone system and it is impossible to vary frequencies of all the base stations in which the interference is expected.

SUMMARY OF THE INVENTION

It is an object of the present invention to provide a digital radiotelephone apparatus capable of reducing a probability of effecting interference between logical control channels transmitted by base stations even if a surrounding base station is not considered and immediately shifting an operation state to a state in which there is no interference when interference occurs so that a personal station can receive control information from the base station exactly.

In order to achieve the above object, according to the present invention, in the digital radiotelephone apparatus including a base station for transmitting control information periodically and a personal station for receiving the control information from the base station to communicate with the base station by a radio signal, the base station comprises control means for varying a transmission timing of the control information dynamically in each period.

BRIEF DESCRIPTION OF THE DRAWINGS

FIG. 22 is a flow chart showing operation of a personal station of the digital radiotelephone apparatus according to the seventh embodiment of the present invention;

FIGS. 28A and 28B are diagrams for explaining a problem in case where intervals of the transmission timing of logical control channels in a prior art are large; and FIG. 29 is a diagram for explaining a problem in case where an interference occurs between logical control channels having the same interval in a prior art.

DESCRIPTION OF THE PREFERRED EMBODIMENTS (FIRST EMBODIMENT)

Figure 1:
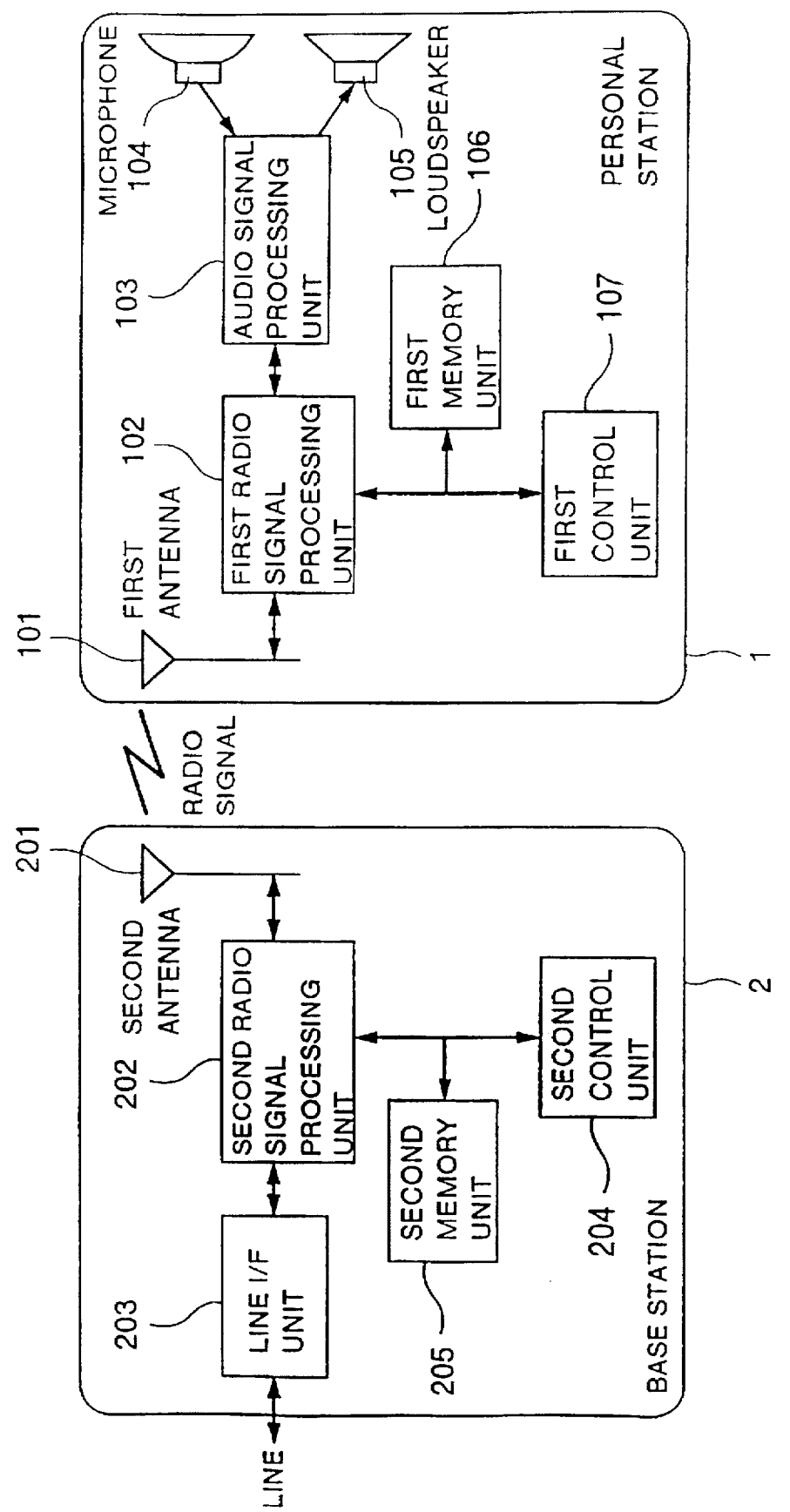
FIG. 1 is a block diagram schematically illustrating a digital radiotelephone apparatus according to a first embodiment of the present invention.

FIG. 1 is a block diagram schematically illustrating a digital radiotelephone apparatus according to a first embodiment of the present invention. In FIG. 1, numeral 1 denotes a personal station capable of performing communication by a radio signal in the time division multiple access (TDMA), and numeral 2 denotes a base station for performing communication with the personal station 1 by radio.

In the personal station 1, numeral 101 denotes a first antenna for transmitting and receiving a radio signal between the base station 2 and the personal station 1, numeral 102 denotes a first radio signal processing unit connected to the first antenna 101 for modulating and demodulating the radio signal, numeral 103 denotes an audio signal processing unit connected to the first radio signal processing unit 102 for processing an audio signal, numeral 104 denotes a microphone used to input a voice or an audio signal to the audio signal processing unit 103, numeral 105 denotes a loudspeaker for producing a voice or an audio signal in response to a signal supplied from the audio signal processing unit 103, numeral 106 denotes a first memory unit for storing a frequency used to receive control information and the received control information, and numeral 107 denotes a first control unit for controlling the whole personal station 1.

Further, in the base station 2, numeral 201 denotes a second antenna for transmitting and receiving a radio signal between the personal station 1 and the base station 2, numeral 202 denotes a second radio signal processing unit connected to the second antenna 202 for modulating and demodulating the radio signal, numeral 203 denotes a line interface (I/F) unit for interfacing a line, numeral 204 denotes a second control unit for controlling the whole base station 2, and numeral 205 denotes a second memory unit for storing a frequency used to transmit control information and the control information.

Operation of the digital radiotelephone apparatus of the embodiment is now described.

In the base station 2, the second control unit 204 always controls the second radio signal processing unit 202 so that the second radio signal processing unit 202 modulates the control information stored in the second memory unit 205 and periodically transmits the modulated control information as a radio signal from the second antenna 201 with the frequency stored in the second memory unit 205.

In the personal station 1, the first control unit 107 always control the first radio signal processing unit 102 so that the first radio signal processing unit 102 receives the radio signal from the base station 2 through the first antenna 101 with the frequency stored in the first memory unit 106 and demodulates the received radio signal to restore the control information. The first control unit 107 stores the restored control information into the first memory unit 106. Further, the first control unit 107 decodes the control information.

When the control information is received exactly, the personal station 1 is in the state in which conversation can be made. This state is called the waiting state.

At this time, when an incoming call arrives at the base station 2 from the line, the second control unit 204 of the base station 2 prepares incoming information which is one of the control information from the second memory unit 205. The second radio signal processing unit 202 modulates the incoming information and transmits the modulated incoming information as a radio signal from the second antenna 201.

The first radio signal processing unit 102 of the personal station 1 receives the radio signal from the base station 2 through the first antenna 101 and demodulates the radio signal to restore the incoming information.

When the first control unit 107 receives the demodulated incoming information, the first control unit 107 prepares response information on the basis of the information stored in the first memory unit 106. The first radio signal processing unit 102 modulates the response information and transmits the modulated response information as a radio signal from the first antenna 101.

Thereafter, conversation is established between the personal station 1 and the line by means of a system including the line interface unit 203, the second radio signal processing unit 202, the second antenna 201, the first antenna 101, the first radio signal processing unit 102, the audio signal processing unit 103, the microphone 104 and the loudspeaker 105 under control of the first control unit 107 of the personal station 1 and the second control unit 204 of the base station 2. Thus, the user can talk with the other party through the microphone 104 and the loudspeaker 105.

As described above, since the personal station 1 becomes in the waiting state by receiving the logical control channel transmitted by the base station 2, the base station 2 always must transmit the logical control channel. Further, the personal station 1 is required to continuously receive the control information from the base station 2 in order to examine whether the radio signal concerning to the incoming call is transmitted or not.

Figure 2:
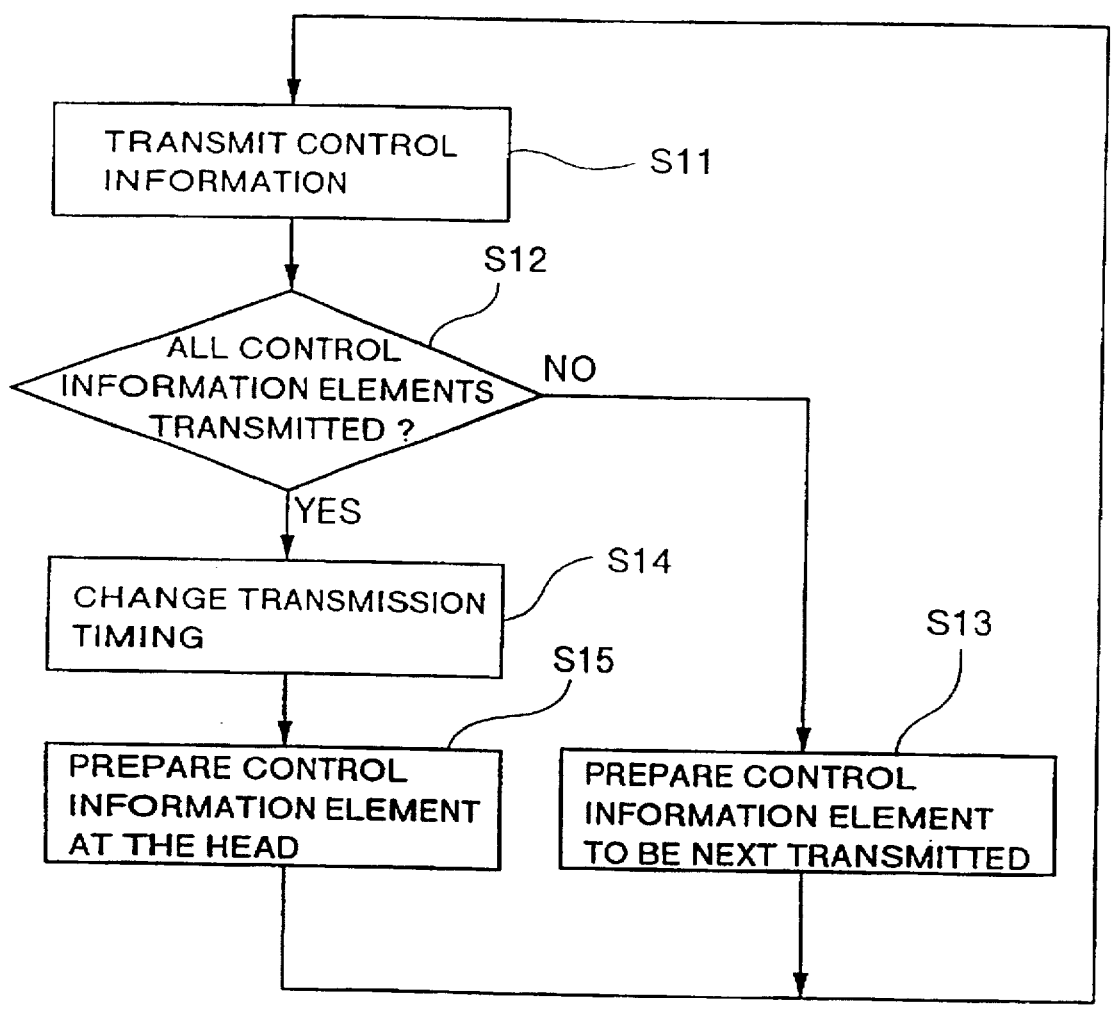
FIG. 2 is a flow chart showing operation of a base station of the digital radiotelephone apparatus according to the first embodiment of the present invention.
Figure 3:
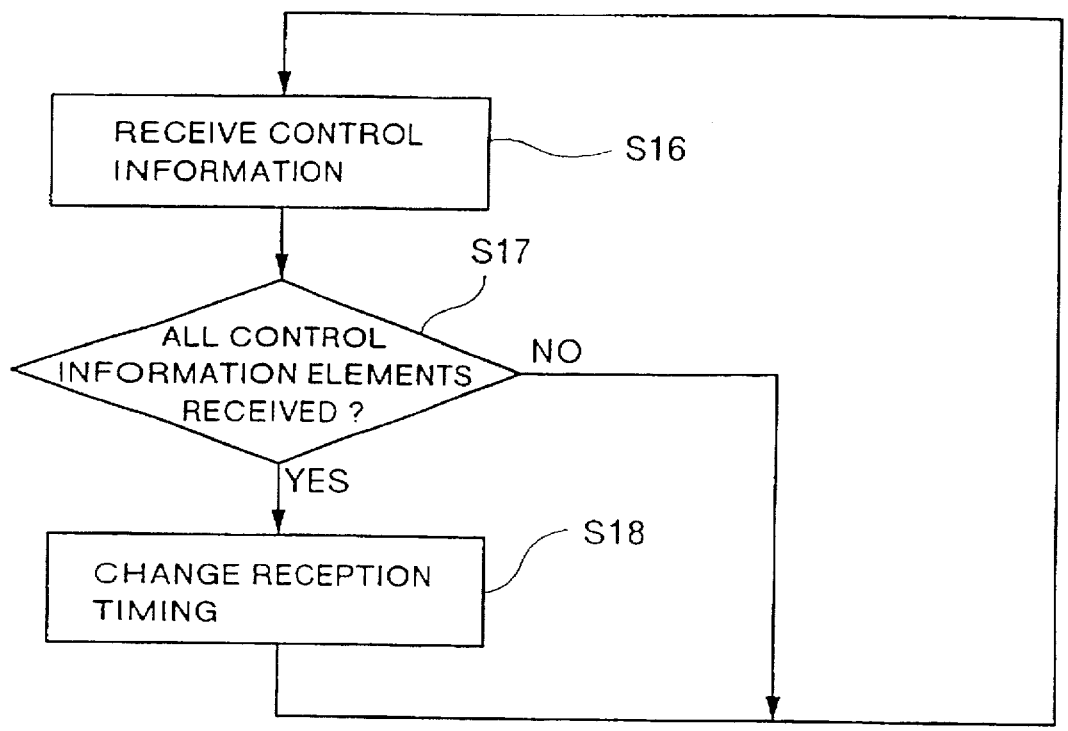
FIG. 3 is a flow chart showing operation of a personal station of the digital radiotelephone apparatus according to the first embodiment of the present invention.

Referring now to FIGS. 2 and 3, the interference avoidance operation of the first embodiment is described.

FIG. 2 is a flow chart showing operation of the base station of the digital radiotelephone apparatus of the first embodiment of the present invention. The interference avoidance of the base station 2 is now described with reference to the flow chart.

Operation of the base station 2 is first described with reference to the flow chart of FIG. 2.

The second control unit 204 controls the second radio signal processing unit 202 to transmit one of the control information at the transmission timing set in consideration of the predetermined offset value of the transmission time (step S11).

Then, the second control unit 204 judges whether the control information element which is not transmitted yet is present or not (step S12). If there is any control information element not transmitted, the control information element to be next transmitted is read out from the second memory unit 204 (step S13), and the process is returned to step S11.

Further, when the second control unit 204 judges at step S12 that all of the control information elements have been transmitted, the second control unit 204 changes a set value of the transmission timing (step S14) and reads out the control information element to be transmitted at the head from the second memory unit 205 (step S15). Then, the process is returned to step S11 and the same operation is repeated.

With the above operation, each time all of the control information elements are transmitted, the transmission timing is changed.

Referring now to the flow chart of FIG. 3, operation of the personal station 1 which communicates with the base station 2 is described.

When the first radio signal processing unit 102 receives one of the control information elements at the timing set in consideration of the predetermined offset value of the reception timing (step S16), the first control unit 107 stores the information element into the first memory unit 106 and judges whether all of the control information elements have been received or not (step S17). When it is judged on the basis of the judgment that all of the control information elements have been received, the first control unit 107 changes a set value of the reception timing (step S18) and the process is returned to step S16. On the other hand, when it is judged from the judgment of step S17 that all of the control information elements are not received, the process is returned to step S16 without any operation.

Figure 4A:
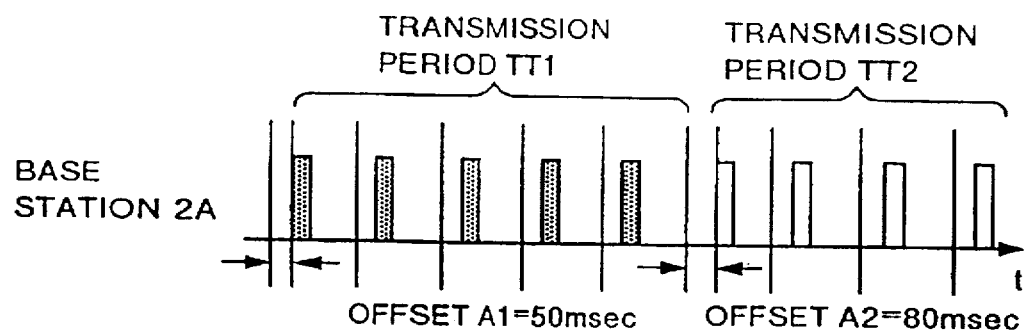
FIGS. 4A and 4B are transmission timing charts of control information of the base station of the digital radiotelephone apparatus according to the first embodiment of the present invention.
Figure 4B:
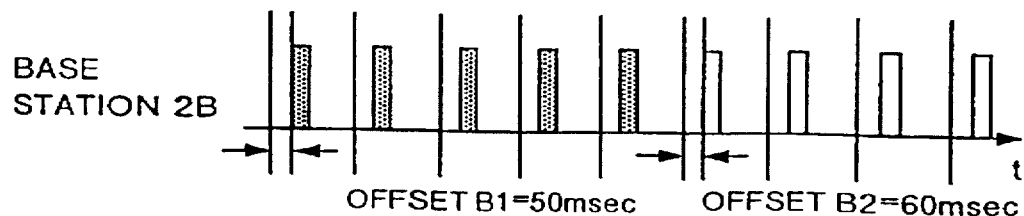

Referring now to FIGS. 4A and 4B, the interference state with a surrounding base station in the case where the interference avoidance operation is performed by dynamically changing the transmission timing in each transmission period of all of the control information elements is now described.

It is assumed that the base stations 2A and 2B having the same configuration as that of the base station 2 of FIG. 1 are installed adjacent to each other.

Further, in FIGS. 4A and 4B, t represents time, A1, A2, B1 and B2 represent offset values of the transmission timing, and TT1 and TT2 represent transmission periods.

First of all, in the transmission period TT1, when the offset values A1 and B1 of the transmission timings of the base stations 2A and 2B are as equal to each other as 50 milliseconds, the base stations 2A and 2B interfere with each other in this transmission period. However, in the next transmission period TT2, since the base stations 2A and 2B change the offset values of the transmission timings to values A2 and B2, respectively (in the embodiment, 80 milliseconds for the base stations 2A and 60 milliseconds for the base station 2B), and the offset values A2 and B2 are different from each other, the interference does not occur.

As described above, in the embodiment, even if the offset value of the transmission timing of the base station is the same as that of the adjacent base station so that the interference occurs therebetween, the interference occurs in only one period and does not occur in the subsequent transmission periods.

Such effect can be expected sufficiently even in any base station of the public base station (PBS) in the cellular system and the domestic base station (DBS) of the cordless telephone apparatus in a home. However, when the technique of the present invention is used in the domestic base station, more remarkable effect can be expected. In other words, the system in which the public base stations are unitarily managed may employ the above configuration of the embodiment, while even when the configuration is not used, the interval value can be set for each base station as in the prior art and be managed so that the interval value is not equal to that of the base station having the possibility that interference occurs to thereby prevent the interference to some extent. In the cordless telephone apparatus in home, however, since installation and management of the domestic base station (DBS) are left to the user and are not made in cooperation with a surrounding domestic base station, it is impossible to construct a system in which the base stations are unitarily managed as in the prior art. Accordingly, it can be understood that the above embodiment in which the domestic base station can be installed without considering a surrounding domestic base station is particularly effective for prevention of interference between the cordless telephones. The embodiment is particularly effective for a place where a distance between adjacent homes or the domestic base stations is short and the possibility that interference occurs is high as in an apartment house as compared with common resistances.

(SECOND EMBODIMENT)

Figure 5:
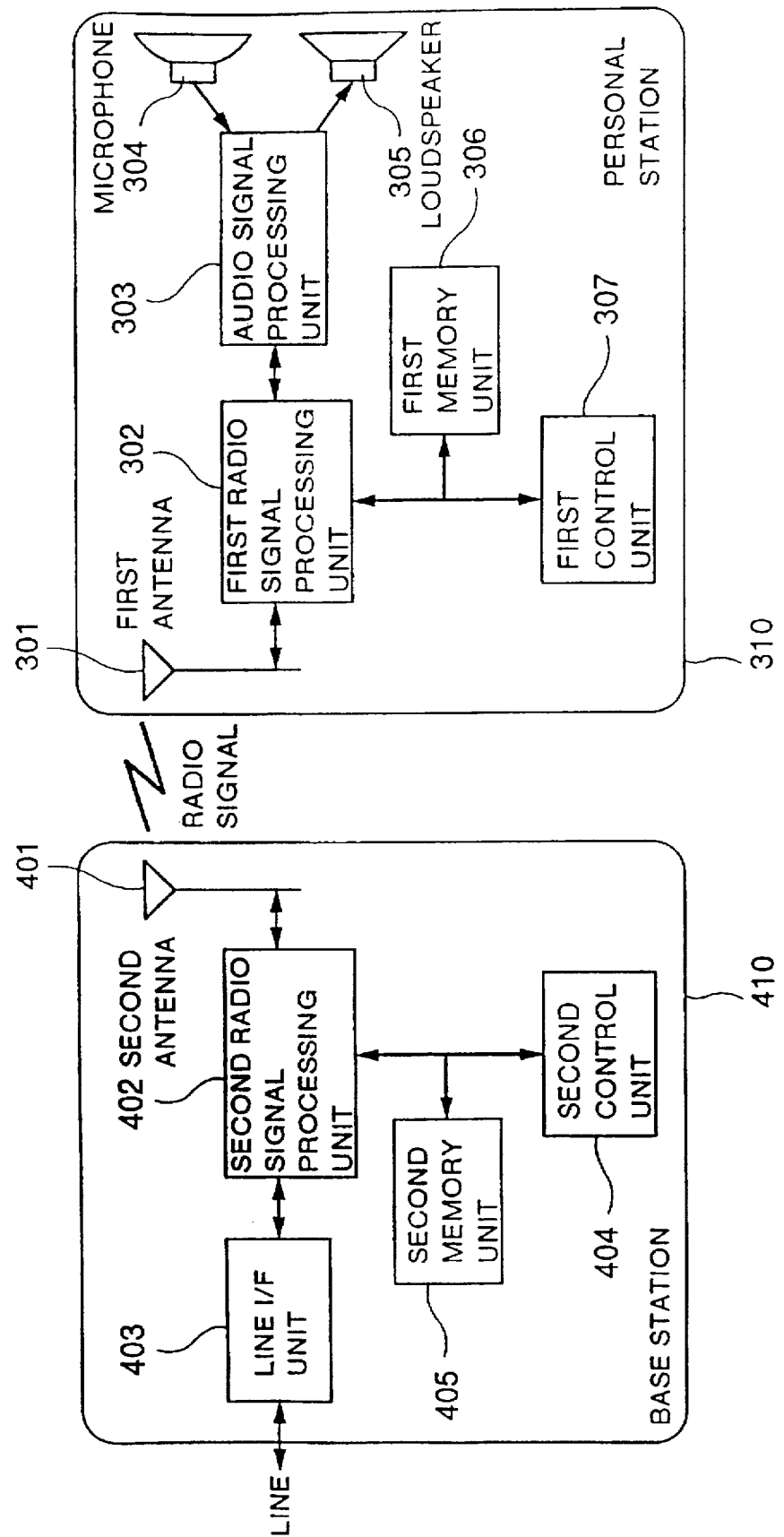
FIG. 5 is a block diagram schematically illustrating a digital radiotelephone apparatus according to a second embodiment of the present invention.

FIG. 5 is a block diagram schematically illustrating a digital radiotelephone apparatus according to a second embodiment of the present invention. In FIG. 5, numeral 310 denotes a personal station capable of performing communication by a radio signal in the time division multiple access (TDMA) and numeral 410 denotes a base station for performing communication with the personal station 310.

In the personal station 310, numeral 301 denotes a first antenna for transmitting and receiving a radio signal between the base station 410 and the personal station 310, numeral 302 denotes a first radio signal processing unit connected to the first antenna 301 for modulating and demodulating the radio signal, numeral 303 denotes an audio signal processing unit connected to the first radio signal processing unit 302 for processing an audio signal, numeral 304 denotes a microphone used to input a voice or an audio signal to the audio signal processing unit 303, numeral 305 denotes a loudspeaker for producing a voice or an audio signal in response to a signal supplied from the audio signal processing unit 303, numeral 306 denotes a first memory unit for storing a first frequency f1 for receiving control information, a second frequency f2 for receiving control signal, and the received control information, and numeral 307 denotes a first control unit for controlling the whole personal station 310.

Further, in the base station 410, numeral 401 denotes a second antenna for transmitting and receiving a radio signal between the personal station 310 and the base station 410, numeral 402 denotes a second radio signal processing unit connected to the second antenna 401 for modulating and demodulating the radio signal, numeral 403 denotes a line interface (I/F) unit for interfacing a line, numeral 404 denotes a second control unit for controlling the whole base station 410, and numeral 405 denotes a second memory unit for storing a first frequency f1 used to transmit control information, a second frequency f2 used to transmit control information, and the control information.

In the base station 410, the second control unit 404 always controls the second radio signal processing unit 402 so that the second radio signal processing unit 402 modulates the control signal stored in the second memory unit 405 and transmits the modulated control signal as a radio signal from the second antenna 401 with the first frequency f1 stored in the second memory 405. After a predetermined delay time, the second radio signal processing unit 402 transmits the modulated control information as a radio signal from the second antenna 401 with the second frequency f2.

In the personal station 1, the first control unit 307 controls the first radio signal processing unit 302 so that the first radio signal processing unit 302 receives the radio signal by the first antenna 301 with the first frequency f1 stored in the first memory unit 306. When the radio signal cannot be received due to any cause, the first radio signal processing unit 302 receives the radio signal by the first antenna 301 with the second frequency f2 stored in the first memory unit 106. Other operation is the same as that of the above first embodiment.

Figure 6:
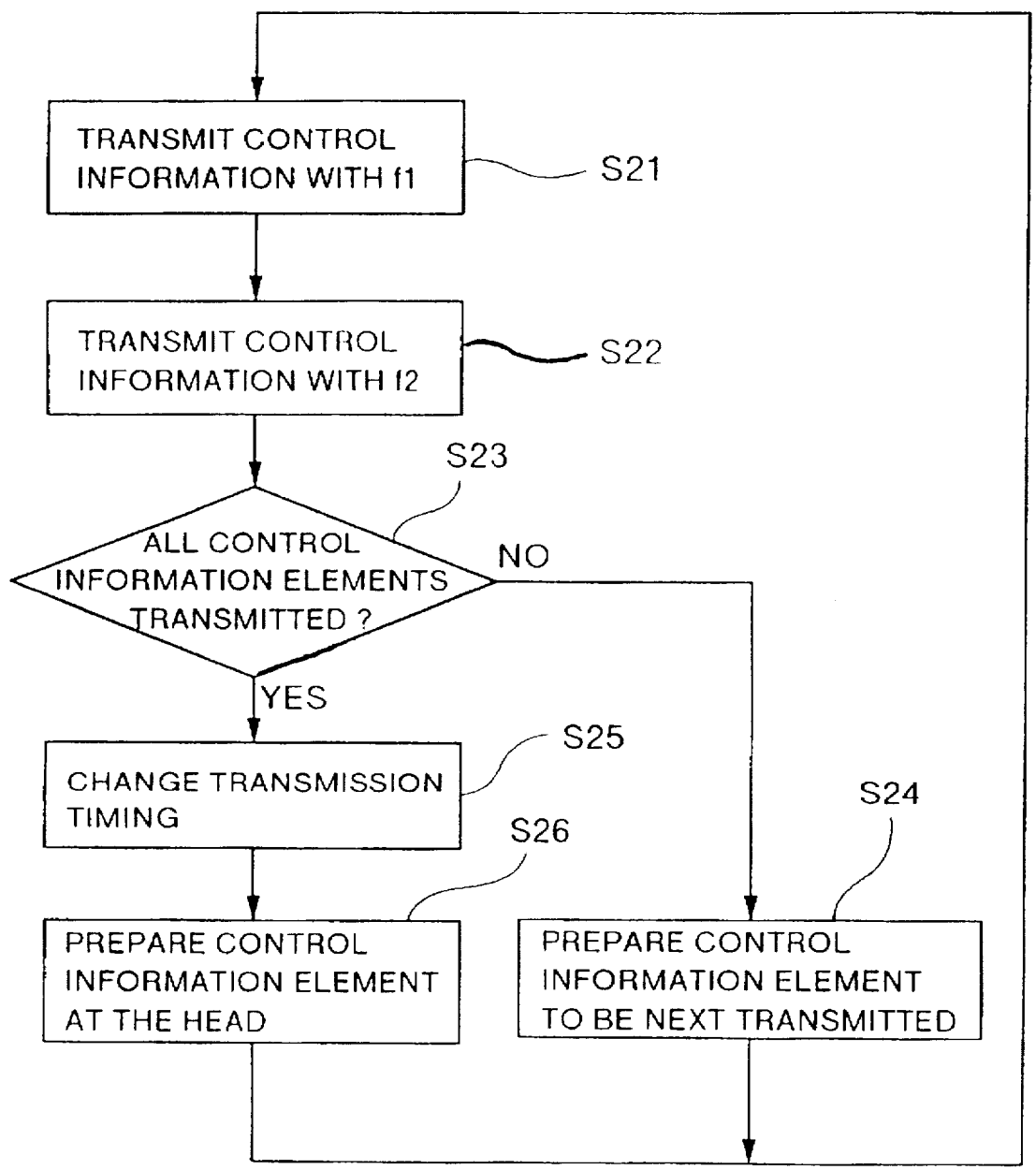
FIG. 6 is a flow chart showing operation of a base station of the digital radiotelephone apparatus according to the second embodiment of the present invention.
Figure 7:
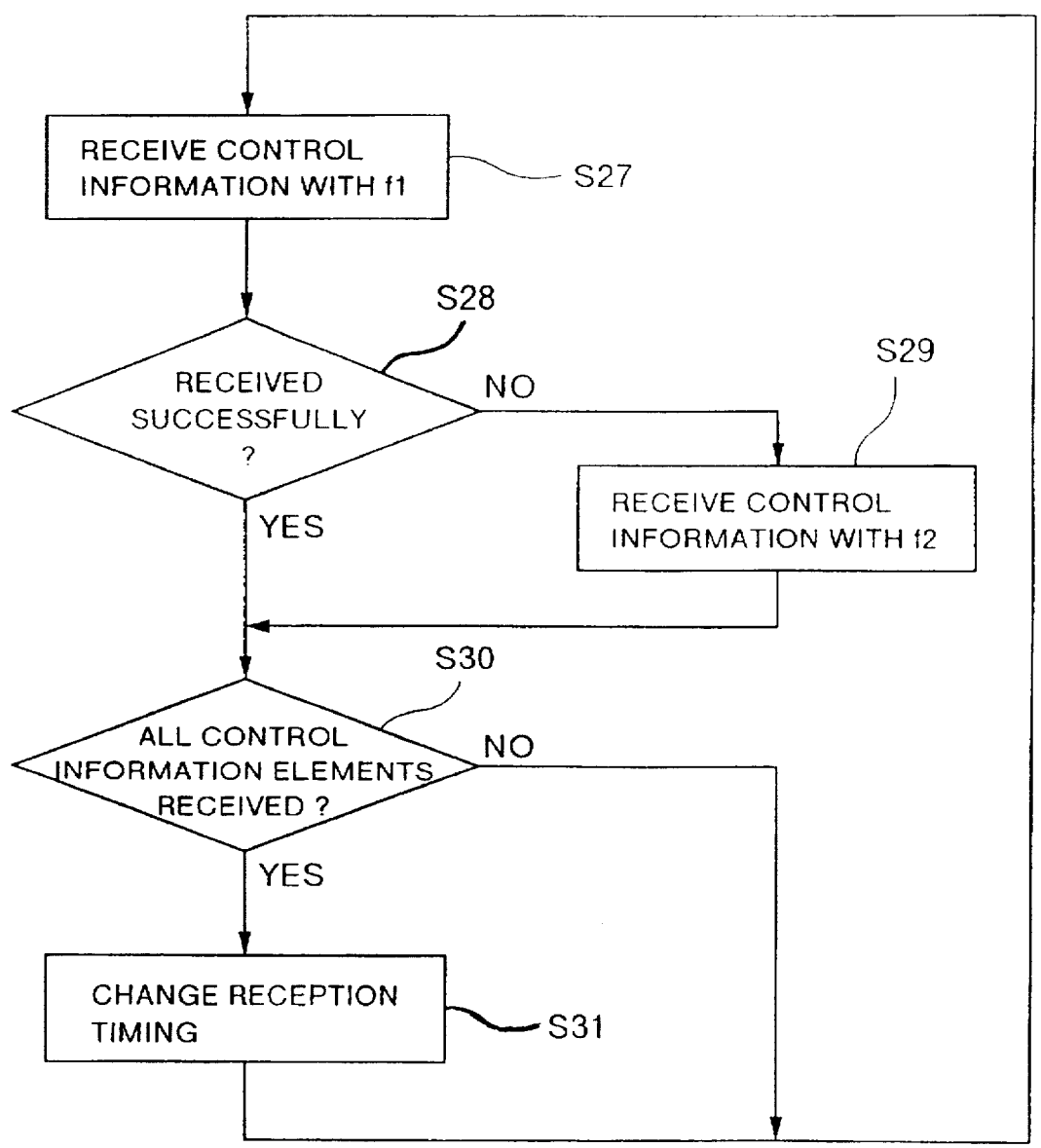
FIG. 7 is a flow chart showing operation of a personal station of the digital radiotelephone apparatus according to the second embodiment of the present invention.

Referring now to FIGS. 6 and 7, the interference avoidance operation in the digital radiotelephone apparatus as described above is described.

Operation of the base station 410 is first described with reference to the flow chart of FIG. 6.

The second control unit 404 reads out the control information from the second memory unit 406 and controls the second radio signal processing unit 402 to transmit the control information with the first frequency f1 (step S21). Thereafter, the second control unit 404 transmits the same control information as that transmitted with the first frequency f1, with the second frequency f2 after delaying the control information by a predetermined offset value (step S22). Then, the second control unit 404 judges whether all of the control information elements stored in the second memory unit 406 have been transmitted or not (step S23). When all of the control information elements are not transmitted yet, the second control unit 404 prepares the control information element to be next transmitted (step S24) and the process is returned to step S21. On the other hand, when the base station 410 has transmitted all of the control information elements (step S23), the offset value of the transmission timing is changed (step S25) and the control information element to be transmitted at the head is prepared (step S26). Then, the process is returned to step S21.

Operation of the personal station 310 is now described with reference to the flow chart of FIG. 7.

The first radio signal processing unit 302 receives the control information transmitted by the base station 410 by the first antenna 301 with the first frequency f1 (step S27). Thereafter, the first control unit 307 judges whether the reception is successful and the control information could have been received from the base station 410 exactly or not (step S28). When the reception of the control information is successful, the process proceeds to step S30, while when the reception of the control information is unsuccessful, the first control unit 307 controls the first radio signal processing unit 302 to change the reception frequency to the second frequency f2 and receive the control information (step S29).

Thereafter, the first control unit 307 judges whether the personal station 310 has received all of the control information elements or not (step S30). When the personal station 310 does not receive all of the control information elements, the process is returned to step S27 without any operation. When the personal station 310 has received all of the control information elements, the offset value of the reception timing is changed (step S31) and the process is returned to step S27.

Figure 8A:
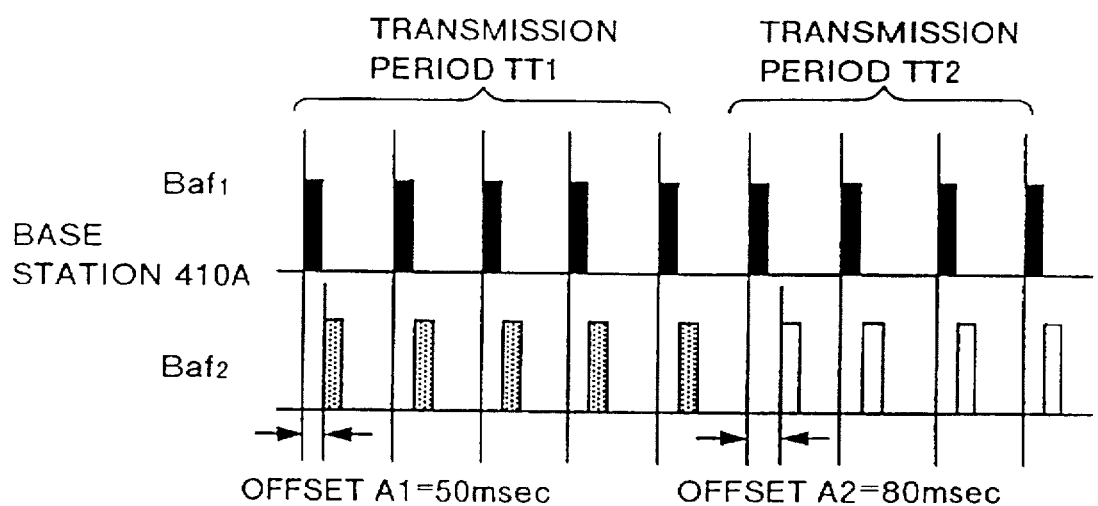
FIGS. 8A and 8B are transmission timing charts of control information of the base station of the digital radiotelephone apparatus according to the second embodiment of the present invention.
Figure 8B:
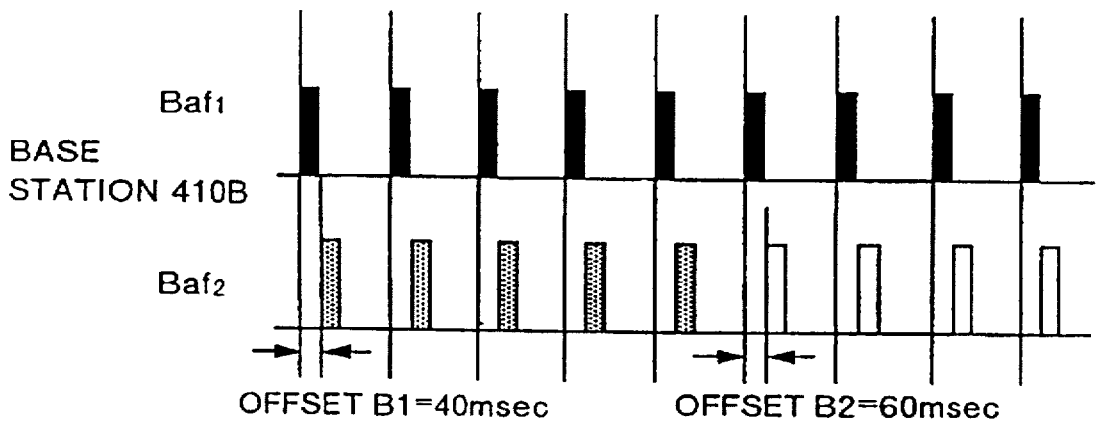

Referring now to a timing chart shown in FIGS. 8A and 8B, the interference state with a surrounding base station in the case where the reception timing is dynamically changed for each transmission period of the whole control information elements to thereby avoid interference is described.

In FIGS. 8A and 8B, Baf1 and Baf2 show the timing of the logical control channels transmitted by base stations 410A and 410B, which have the same configuration as that of the base station 410 of FIG. 5 and are located adjacent to each other, with frequencies f1 and f2. Further, in FIGS. 8A and 8B, t represents time, A1, A2, B1 and B2 represent offset values of the transmission timing, TT1 and TT2 represent transmission periods.

First of all, it is assumed that the transmission timing of the signal from the base station 410A is the same as that of the signal from the base station 410B in the frequency f1. Both of the base stations 410A and 410B continue transmission at the fixed intervals in the frequency f1 and accordingly the interference state always occurs between both of the base stations.

On the other hand, in the frequency f2, both the base stations have different offset values from each other and accordingly there is no interference therebetween. Even if the offset value A1 of the transmission timing of the base station 410A is the same as the offset value B1 of the transmission timing of the base station 410B and both the offset values are 50 milliseconds as in the transmission period TT1, the interference occurs in this transmission period, while in the next transmission period TT2 the base stations 410A and 410B change the offset values A1 and B1 of the transmission timing to offset values A2 and B2, respectively (in the embodiment 80 milliseconds for the base station 410A and 60 millisecond for the base station 410B), and the offset values are different from each other. Accordingly, the interference state does not occur thereafter.

Thus, when the personal station 310 cannot receive the control information with the first frequency f1, the personal station 310 can receive the same control information with the second frequency f2. Further, even when the logical control channel enters the interference state temporarily in the transmission of the control information with the second frequency f2, the state can move to the state having no interference rapidly to escape from the interference state rapidly without staying in the interference state, so that the personal station 310 can receive the control information from the base stations 410A and 410B. Accordingly, since influence due to the interference can be suppressed to the minimum even when the used frequency is the same as that of the adjacent base stations 410A and 410B, it is not necessary to set a different frequency for each base station and the assigned frequency can be used effectively, so that the interference can be prevented while a plurality of frequencies are utilized in assignment of the limited frequencies.

(THIRD EMBODIMENT)

Figure 9:
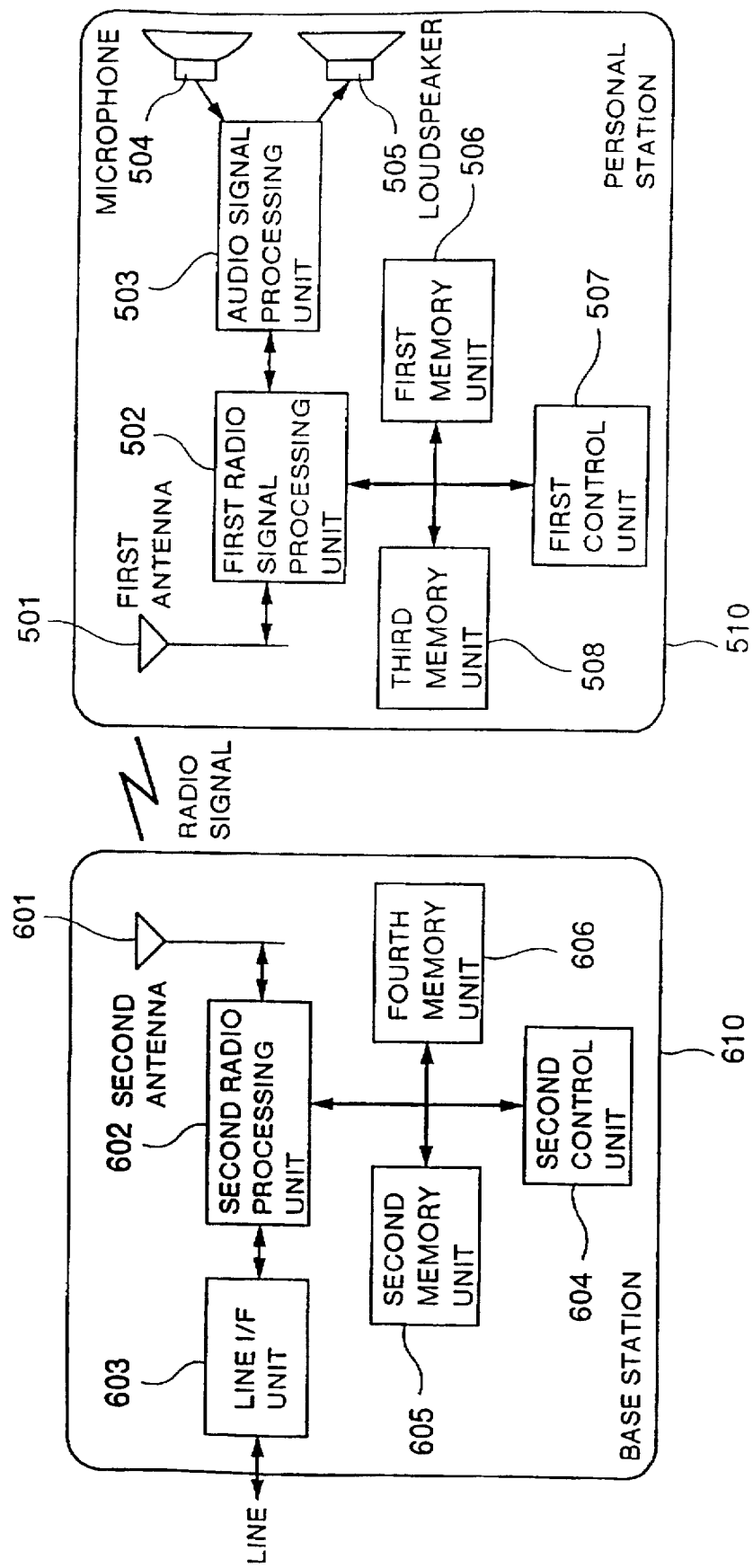
FIG. 9 is a block diagram schematically illustrating a digital radiotelephone apparatus according to a third embodiment of the present invention.

FIG. 9 is a block diagram schematically illustrating a digital radiotelephone apparatus according to a third embodiment of the present invention. In FIG. 9, numeral 510 denotes a personal station capable of performing communication by a radio signal in the time division multiple access (TDMA) and numeral 610 denotes a base station for performing communication with the personal station 510 by radio.

In the personal station 510, numeral 501 denotes a first antenna for transmitting and receiving a radio signal between the base station 610 and the personal station 510, numeral 502 denotes a first radio signal processing unit connected to the first antenna 501 for modulating and demodulating the radio signal, numeral 503 denotes an audio signal processing unit connected to the first radio signal processing unit 502 for processing an audio signal, numeral 504 denotes a microphone used to input a voice or an audio signal to the audio signal processing unit 503, numeral 505 denotes a loudspeaker for producing a voice or an audio signal in response to a signal from the audio signal processing unit 503, numeral 506 denotes a first memory unit for storing a frequency for receiving control information and the received control information, numeral 507 denotes a first control unit for controlling the whole personal station 510, and numeral 508 denotes a third memory unit for storing a table (reception timing table) for determining a reception timing of the control information.

Further, in the base station 610, numeral 601 denotes a second antenna for transmitting and receiving the radio signal between the personal station 510 and the base station 610, numeral 602 denotes a second radio signal processing unit connected to the second antenna 601 for modulating and demodulating the radio signal, numeral 603 denotes a line interface (I/F) unit for interfacing a line, numeral 604 denotes a second control unit for controlling the whole base station 610, numeral 605 denotes a second memory unit for storing a frequency used to transmit the control information and the control information, and numeral 606 denotes a fourth memory unit for storing a table (transmission timing table) for determining a transmission timing of the control information.

The table stored in the third memory unit 508 of the personal station 510 is the same as the table stored in the fourth memory unit 606 of the base station 610, and the algorithm performed by the first control unit 507 of the personal station 510 for determining and changing a selection location of the table in the third memory unit 508 is the same as the algorithm performed by the second control unit 604 of the base station 610 for determining and changing a selection location of the table in the fourth memory unit 606.

In the base station 610, the second control unit 604 controls the second radio signal processing unit 602 to modulate the control information stored in the second memory unit 605 with the first frequency f1 stored in the second memory unit 605 and transmit the modulated control information as a radio signal from the second antenna 601.

The second control unit 604 then determines a preset value on the basis of the table stored in the fourth memory unit 606. After an elapse of a time corresponding to the preset value from the transmission time of the control signal with the frequency f1, the second radio signal processing unit 602 is controlled to transmit the same control information as that transmitted with the frequency f1 as a radio signal from the second antenna 601 with the second frequency f2.

In the personal station 510, the first control unit 507 controls the first radio signal processing unit 502 to receive the radio signal with the first frequency f1 stored in the first memory unit 506.

When the radio signal processing unit 502 cannot receive the radio signal with the frequency f1 due to any cause, the first control unit 507 controls the first radio signal processing unit 502 to shift or change the reception frequency to the second frequency f2 and determines the reception timing from the table stored in the third memory unit 508 to cause the first radio signal processing unit 502 to receive the radio signal in accordance with this reception timing.

Figure 10:
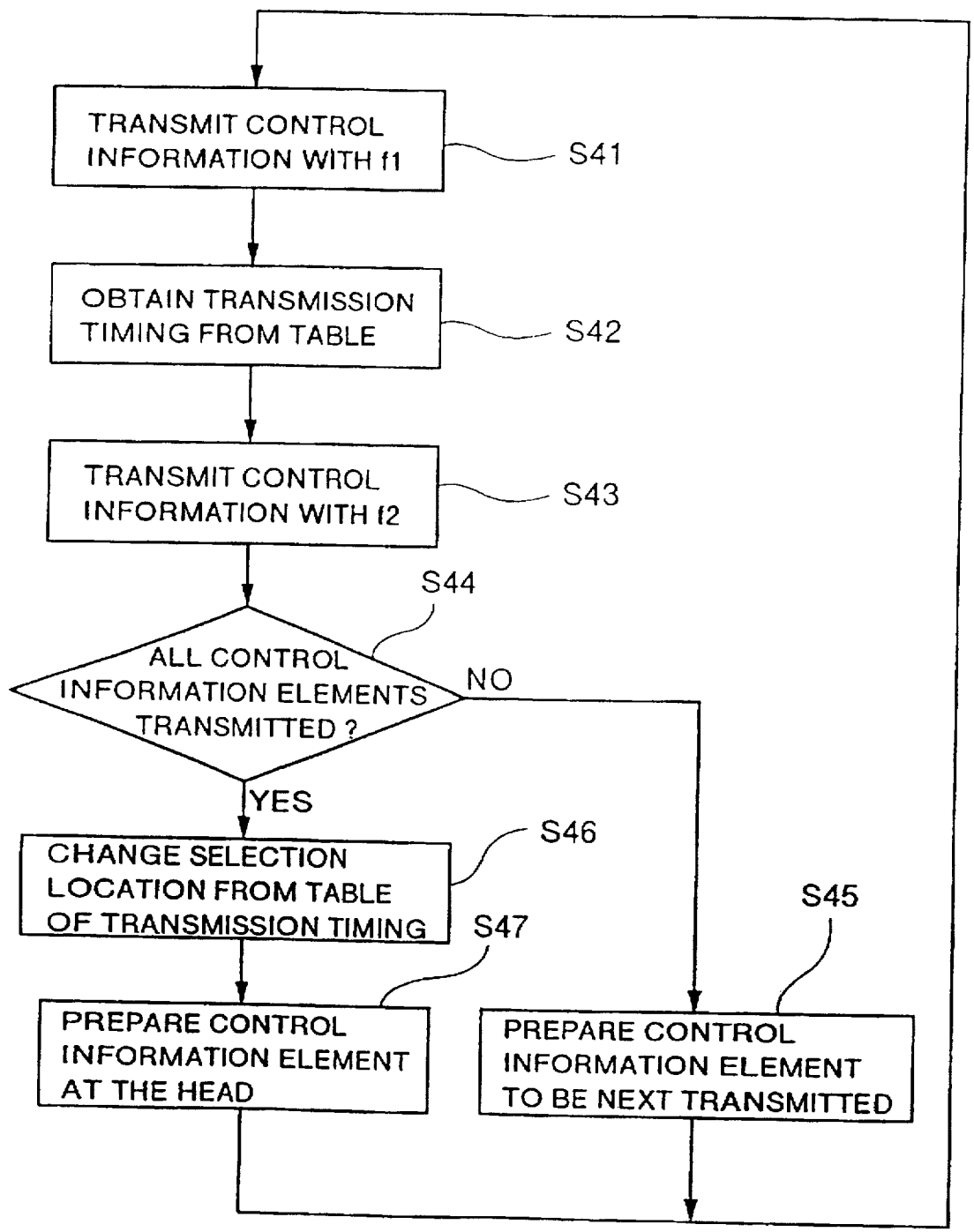
FIG. 10 is a flow chart showing operation of a base station of the digital radiotelephone apparatus according to the third embodiment of the present invention.
Figure 11:
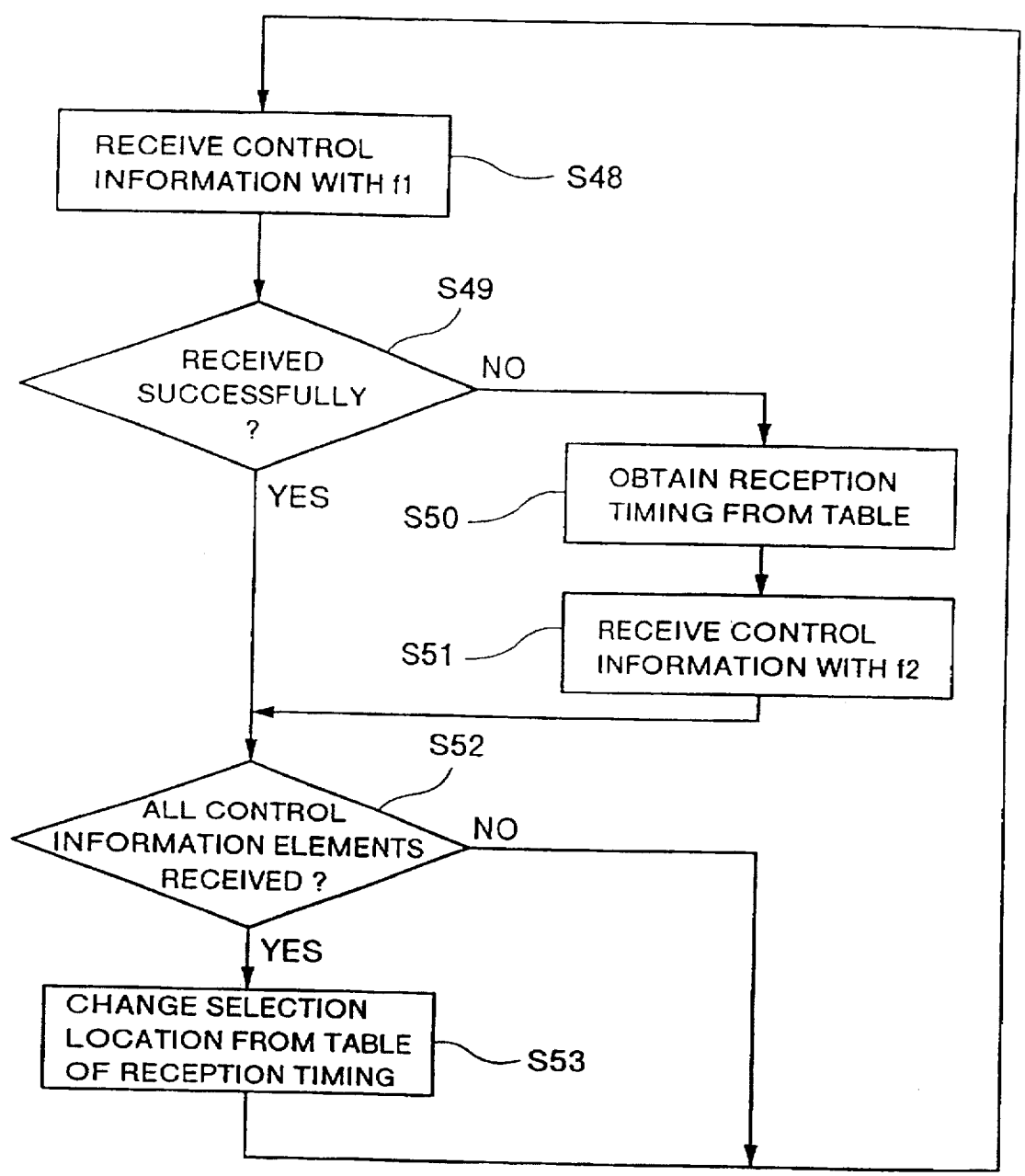
FIG. 11 is a flow chart showing operation of a personal station of the digital radiotelephone apparatus according to the third embodiment of the present invention.

Referring now to FIGS. 10 and 11, the interference avoidance operation of the third embodiment is described.

First of all, operation of the base station 610 is described with reference to the flow chart of FIG. 10.

The second control unit 604 controls the second radio signal processing unit 602 to transmit the control information with the first frequency f1 (step S41). Then, the second control unit 604 obtains the transmission timing with the second frequency f2 to the transmission timing with the first frequency f1 from the table stored in the fourth memory unit 608 (step S42) and controls the second radio signal processing unit 602 to transmit the same control information as that transmitted with the first frequency f1, with the second frequency f2 (step S43).

Thereafter, the second control unit 604 confirms whether all of the control information elements have been transmitted or not (step S44) and if all the elements are not transmitted, the second control unit 604 prepares the control information element to be next transmitted from the second memory unit 605 (step S45) and the process is returned to step S41.

On the other hand, in step S44, when all of the control information elements have been transmitted, the selection location from the table of the transmission timing stored in the fourth memory unit 606 is changed (step S46) and the control information element to be transmitted at the head is prepared from the second memory unit 605 (step S47). Then, the process is returned to step S41.

Operation of the personal station 510 is now described with reference to the flow chart of FIG. 11.

The first control unit 507 controls the first radio signal processing unit 502 to receive the control information with the first frequency f1 (step S48). When the first radio signal processing unit 502 receives the control information successfully (step S49), the process proceeds to step S52, while when the first radio signal processing unit fails to receive the control information, the first control unit 507 obtains the reception timing with the second frequency f2 to the reception timing with the first frequency f1 from the selection location of the table stored in the third memory unit 508 (step S50) and the first control unit 507 controls the first radio signal processing unit 502 to receive the control information with the second frequency f2 (step S51).

Thereafter, the first control unit 507 judges whether all of the control information elements have been received or not (step S52). At this time, when all of the control information elements are not received yet, the process is returned to step S48 without any operation and the same reception operation is repeated. On the other hand, when the personal station 510 has received all of the control information elements (step S52), the selection location stored in the third memory unit 508 is changed (step S53) and the process is returned to step S48.

As described above, in the third embodiment, the base station 610 determines the delayed transmission timing on the basis of the same tables provided in the personal station 510 and the base station 610 and the personal station 510 determines the delayed reception timing on the basis of the table. Accordingly, even when the base station 610 changes the transmission timing dynamically, the personal station 510 can follow the change of the timing and receive the control information.

(FOURTH EMBODIMENT)

Figure 12:
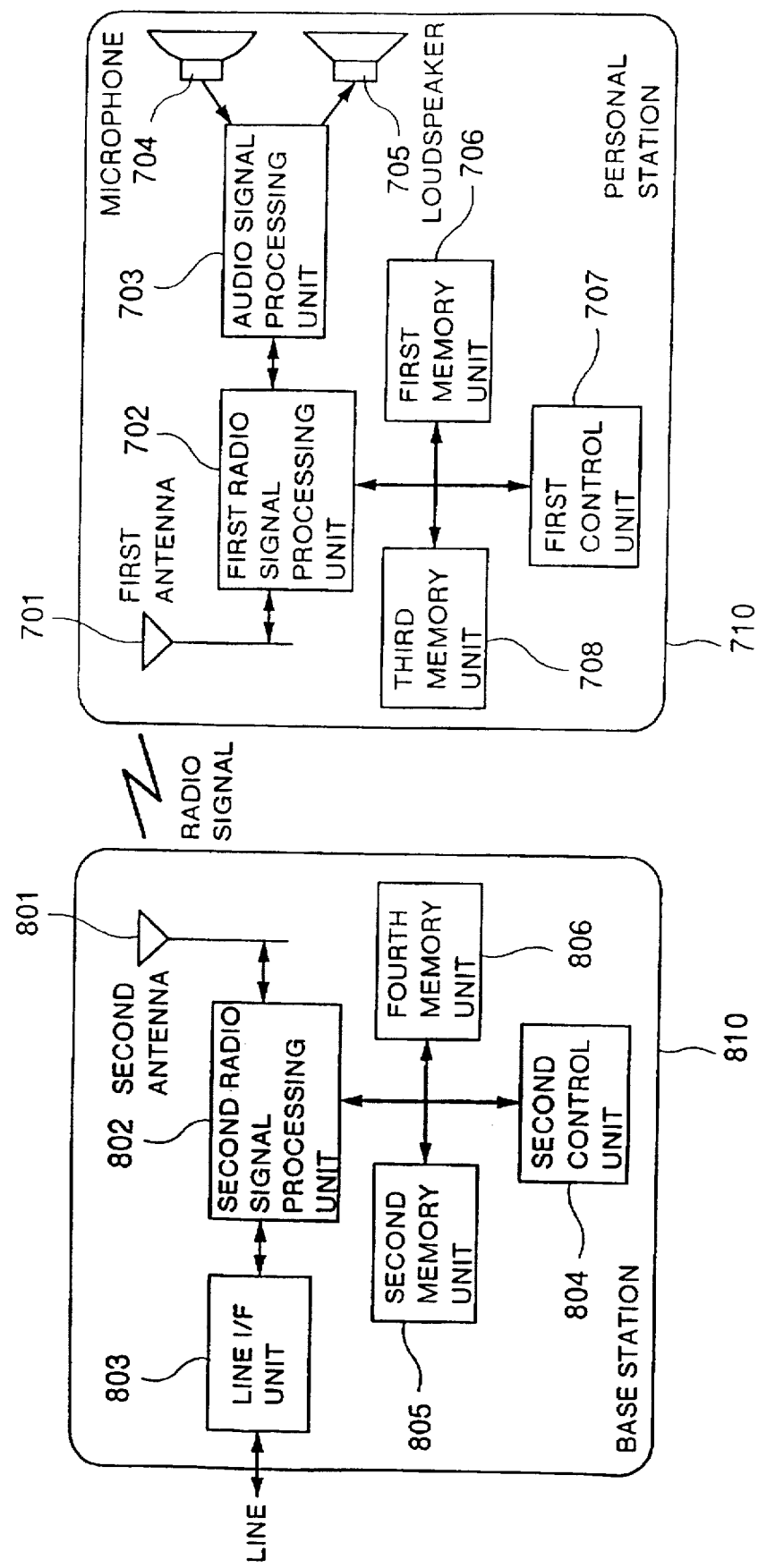
FIG. 12 is a block diagram schematically illustrating a digital radiotelephone apparatus according to a fourth embodiment of the present invention.

FIG. 12 is a block diagram schematically illustrating a digital radiotelephone apparatus according to a fourth embodiment of the present invention. In FIG. 12, numeral 710 denotes a personal station capable of performing communication by a radio signal in the time division multiple access (TDMA), and numeral 810 denotes a base station for performing communication with the personal station 710 by radio.

In the personal station 710, numeral 701 denotes a first antenna for transmitting and receiving a radio signal between the base station 810 and the personal station 710, numeral 702 denotes a first radio signal processing unit connected to the first antenna 701 for modulating and demodulating the radio signal, numeral 703 denotes an audio signal processing unit connected to the radio signal processing unit 702 for processing an audio signal, numeral 704 denotes a microphone used to input a voice or an audio signal to the audio signal processing unit 703, numeral 705 denotes a loudspeaker for producing a voice or an audio signal in response to a signal from the audio signal processing unit 703, numeral 706 denotes a first memory unit for storing a frequency for receiving control information and the received control information, numeral 707 denotes a first control unit for controlling the whole personal station 710, and numeral 708 denotes a third memory unit for storing a table (reception timing table) for determining reception timings of the control information. The first control unit 707 prepares the reception timing table from an identifier (ID) of a desired base station 810 and stores the table in the third memory unit 708. The first control unit 707 then controls the first radio signal processing unit 702 to receive the radio signal with the first frequency f1 stored in the first memory unit 706. When the first radio signal processing unit 702 cannot receive the radio signal due to any cause, the first control unit 707 control to change or shift the reception frequency of the first radio signal processing unit 702 to the second frequency f2 and determines the reception timing from the table stored in the third memory unit 708. Thus, the first control unit 707 controls the first radio signal processing unit 702 to receive the control information signal in accordance with the reception timing.

In the base station 810, numeral 801 denotes a second antenna for transmitting and receiving a radio signal between the personal station 710 and the base station 810, numeral 802 denotes a second radio signal processing unit connect to the second antenna 802 for modulating and demodulating the radio signal, numeral 803 denotes a line interface (I/F) unit for interfacing a line, numeral 804 denotes a second control unit for controlling the whole base station 810, numeral 805 denotes a second memory unit for storing a frequency for transmitting control information and the control information, and numeral 806 denotes a fourth memory unit for storing a table (transmission timing table) for determining transmission timings of the control information. The second control unit 804 prepares the transmission timing table from an identifier (ID) of its own base station and stores the table in the fourth memory unit 806. Thus, the second control unit 804 controls the second radio signal processing unit 802 to transmit the control information stored in the second memory unit 805 with the frequency f1 and transmit the same control information as a radio signal from the second antenna 801 with the second frequency f2 at the transmission timing determined in the table stored in the fourth memory unit 806. The second control unit 802 always performs the above control.

Figure 13:
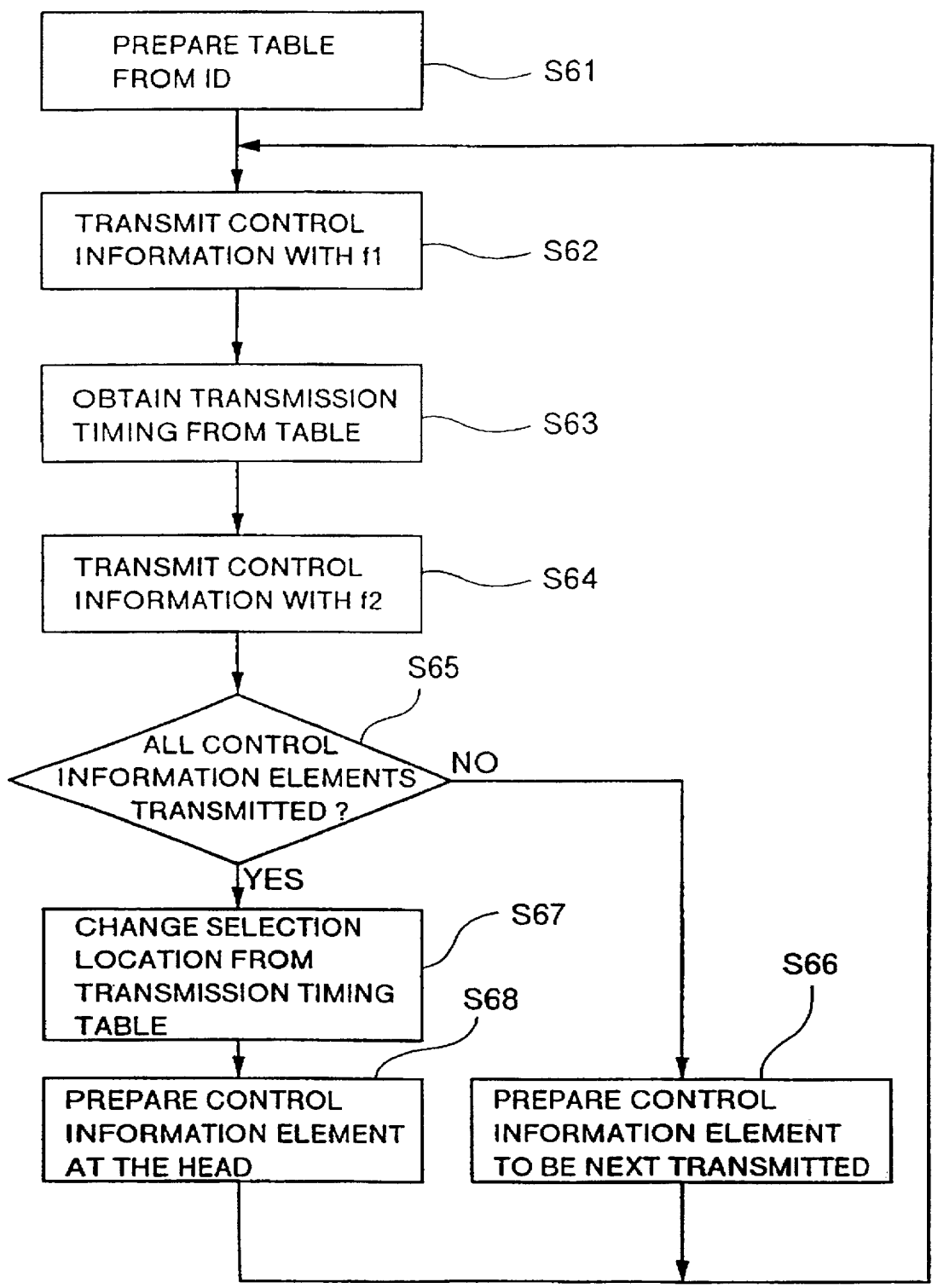
FIG. 13 is a flow chart showing operation of a base station of the digital radiotelephone apparatus according to the fourth embodiment of the present invention.
Figure 14:
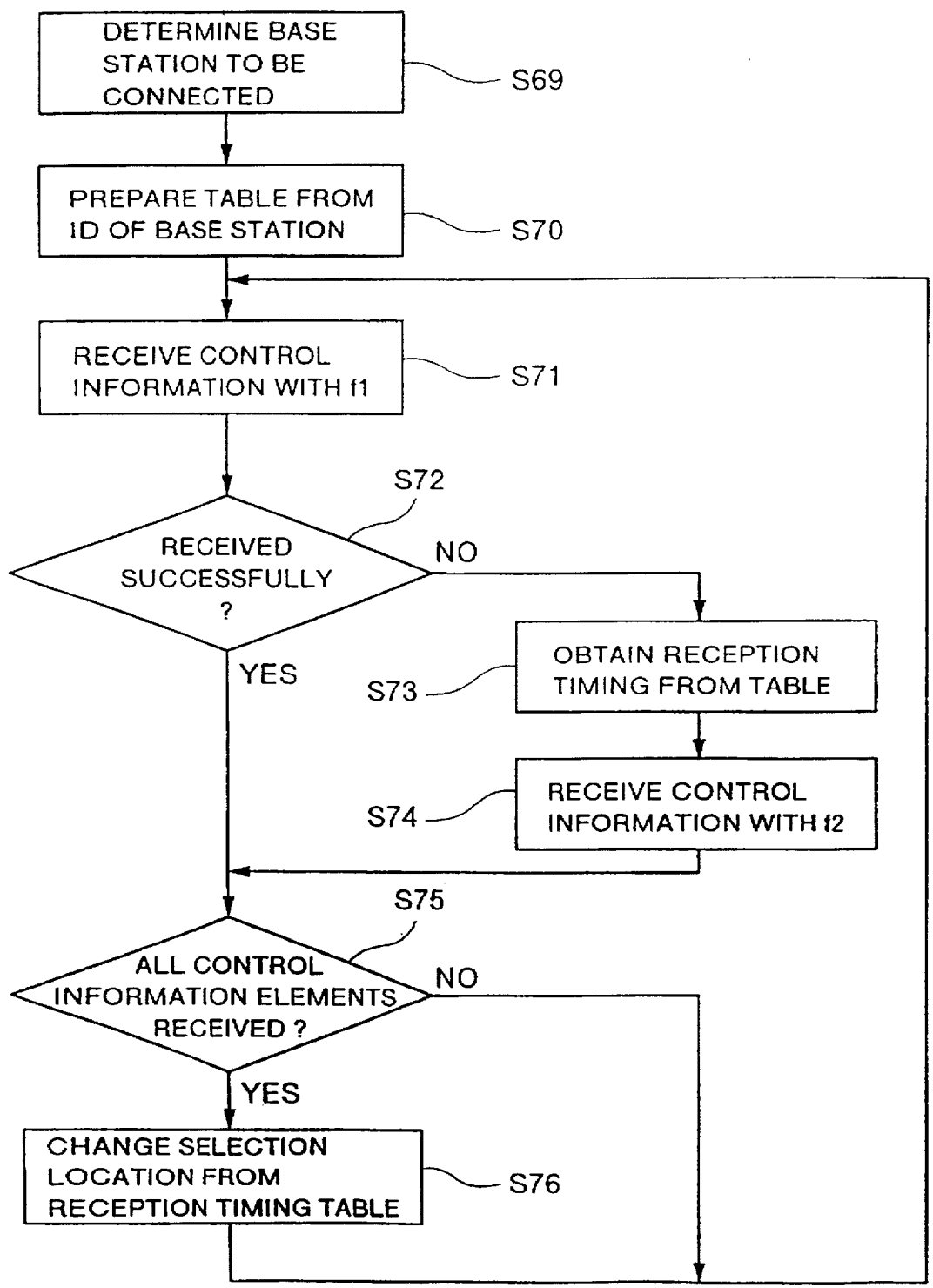
FIG. 14 is a flow chart showing operation of a personal station of the digital radiotelephone apparatus according to the fourth embodiment of the present invention.

Referring now to FIGS. 13 and 14, the inference avoidance operation of the fourth embodiment is described.

First of all, operation of the base station 810 is described with reference to the flow chart of FIG. 13.

The second control unit 804 prepares the transmission timing table on the basis of the identifier (ID) of its own base station (step S61). The second control unit 804 reads out the control information from the second memory unit 805 and controls the second radio signal processing unit 802 to transmit the control information with the first frequency f1 (step S62). Thus, the second control unit 804 obtains the transmission timing from the table stored in the fourth memory unit 806 (step S63) and controls the second radio signal processing unit 802 to transmit the same control information as that transmitted with the first frequency f1, at the transmission timing with the second frequency f2 (step S64).

Thereafter, the second control unit 804 judges whether all the control information stored in the second memory unit 805 has been transmitted or not (step S65). When all the control information is not transmitted yet, the second control unit 804 prepares the control information element to be next transmitted by reading out it from the second memory unit 805 (step S66) and the process is returned to step S62. On the other hand, in step S65, when it is judged that all the control information elements have been transmitted, the second control unit 804 changes a selection location from the transmission timing table (step S67) and prepares the control information element at the head by reading out it from the second memory unit 805 (step S68). The process is returned to step S62.

Operation of the personal station 710 is now described with reference to the flow chart of FIG. 14.

The first control unit 707 first determines the base station 810 to be connected (step S69) and prepares the reception timing table from the identifier (ID) provided in the base station 810 (step S70). Thus, the first control unit 707 causes the first radio signal processing unit 702 to receive the radio signal with the frequency f1 and receive the control information from the base station 810 (step S71).

The first control unit 707 judges whether the first radio signal processing unit 702 receives the control information successfully or not (step S72). When the first radio signal processing unit 702 has received the control information successfully, the process proceeds to step S75, while when the unit 702 fails to receive the control information, the first control unit 707 obtains the reception timing with the second frequency f2 to the reception timing with the first frequency f1 from the selection location of the table stored in the third memory unit 706 (step S73). Thus, the first control unit 707 controls the first radio signal processing unit 702 to receive the control information with the second frequency f2 at the obtained reception timing (step S74).

After the control information has been received by the above control, the first control unit 707 judges whether all of the control information elements have been received or not (step S75). When all of the control information element are not received yet, the process is returned to step S71. On the other hand, when all of the control information elements have been received, the first control unit 707 changes the selection location of the reception timing table (step S76) and the process is returned to step S71.

As described above, in the fourth embodiment, the base station 810 and the personal station 710 prepare the same table on the basis of the identifier (ID) of the base station 810. Accordingly, when the table is adapted to be obtained from the identifier of the base station 810 uniquely, the base station 810 is not required to prepare the table for each transmission by previously preparing the table in accordance with its own identifier. Further, since the personal station 710 can prepare the table if the identifier of a desired base station is obtained on the basis of the identifier of the connected base station 810, it is not necessary to provide the table for each base station to be desired to be connected and accordingly the memory capacity of the fourth memory unit 806 can be suppressed to the minimum.

(FIFTH EMBODIMENT)

Figure 15:
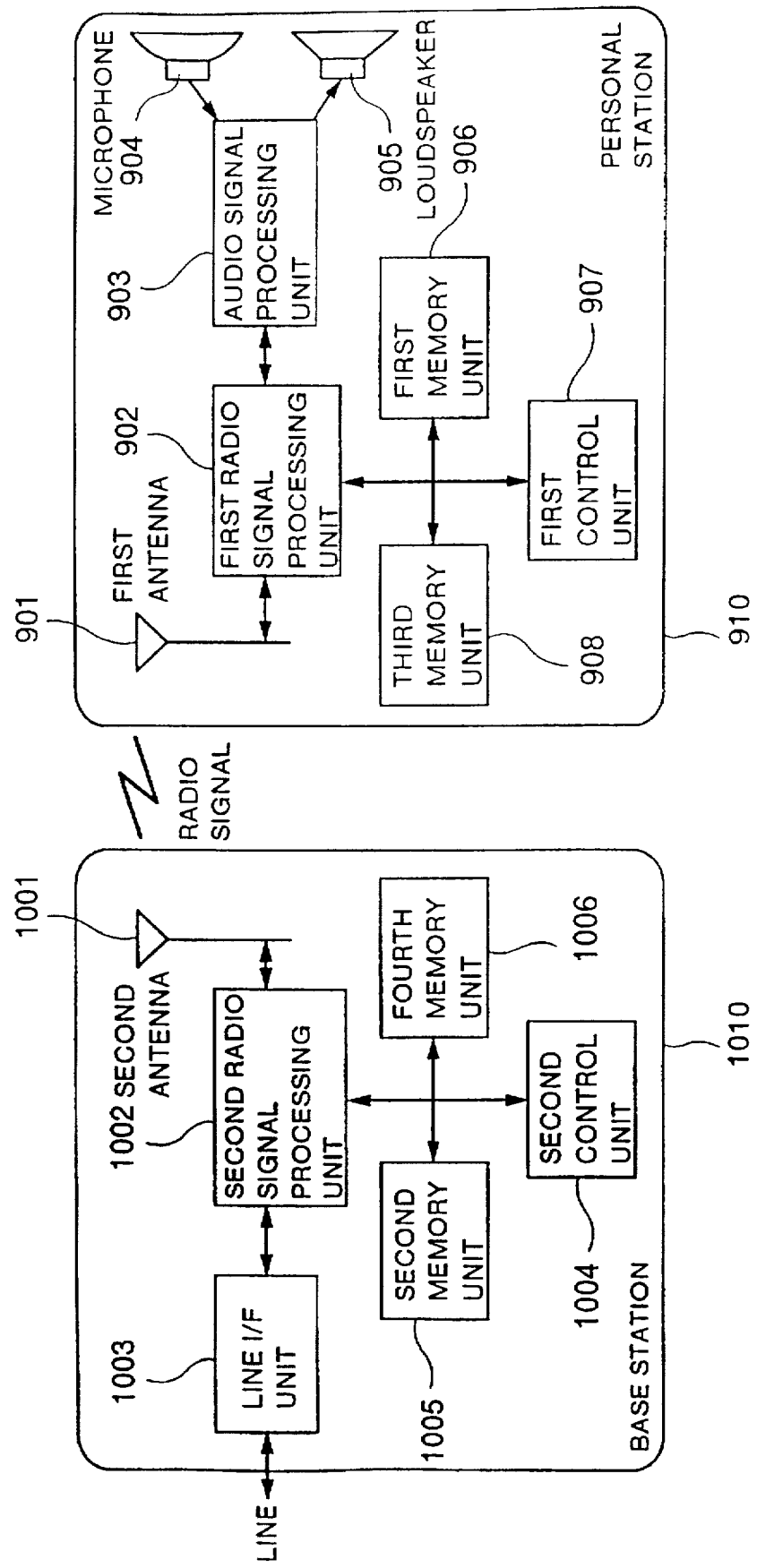
FIG. 15 is a block diagram schematically illustrating a digital radiotelephone apparatus according to a fifth embodiment of the present invention.

FIG. 15 is a block diagram schematically illustrating a digital radiotelephone apparatus according to a fifth embodiment of the present invention. In FIG. 15, numeral 910 denotes a personal station capable of performing communication by a radio signal in the time division multiple access (TDMA), and numeral 1010 denotes a base station for performing communication with the personal station 910 by radio.

In the personal station 910, numeral 901 denotes a first antenna for transmitting and receiving a radio signal between the base station 1010 and the personal station 910, numeral 902 denotes a first radio signal processing unit connected to the first antenna 901 for modulating and demodulating the radio signal, numeral 903 denotes an audio signal processing unit connected to the first radio signal processing unit 902 for processing an audio signal, numeral 904 denotes a microphone used to input a voice or an audio signal to the audio signal processing unit 903, numeral 905 denotes a loudspeaker for producing a voice or an audio signal in response to a signal from the audio signal processing unit 903, numeral 906 denotes a first memory unit for storing a frequency for receiving control information and the received control information, numeral 907 denotes a first control unit for controlling the whole personal station 910, and numeral 908 denotes a third memory unit for storing a table (reception timing table) for determining reception timings of control information. The first control unit 907 controls the first radio signal processing unit 907 to receive the control information with the first frequency f1. When the first radio signal processing unit 907 cannot receive the radio signal due to any cause, the first control unit 907 determines the reception timing from the table stored in the third memory unit 908 and controls the first radio signal processing unit 902 to receive the control information with the second frequency f2 at the determined reception timing. At this time, the first control unit 907 judges whether the transmission timing information is contained in the received control information or not. When the transmission timing information is contained in the received control information, the first control unit 907 controls to search the table stored in the third memory unit 908 for the same value and change the selection location of the reception timing.

In the base station 1010, numeral 1001 denotes a second antenna for transmitting and receiving a radio signal between the personal station 910 and the base station 1010, numeral 1002 denotes a second radio signal processing unit connected to the second antenna 1001 for modulating and demodulating the radio signal, numeral 1003 denotes a line interface (I/F) unit for interfacing a line, numeral 1004 denotes a second control unit for controlling the whole base station 1010, numeral 1005 denotes a second memory unit for storing a frequency for transmitting control information and the control information, and numeral 1006 denotes a fourth memory unit for storing a table (transmission timing table) for determining the transmission timing of the control information. The second control unit 1004 prepares the transmission timing table from the identifier (ID) of the base station 1010 and stores it in the fourth memory unit 1006. Thus, the second control unit 1004 controls the second radio signal processing unit 1002 to transmit the control information stored in the second memory unit 1005 as a radio signal and then extracts the transmission timing from a predetermined location of the table stored in the fourth memory unit 1006. Further, the second control unit 1004 controls the second radio signal processing unit 1002 to transmit the control information as a radio signal with the second radio frequency f2 at the extracted timing.

Figure 16:
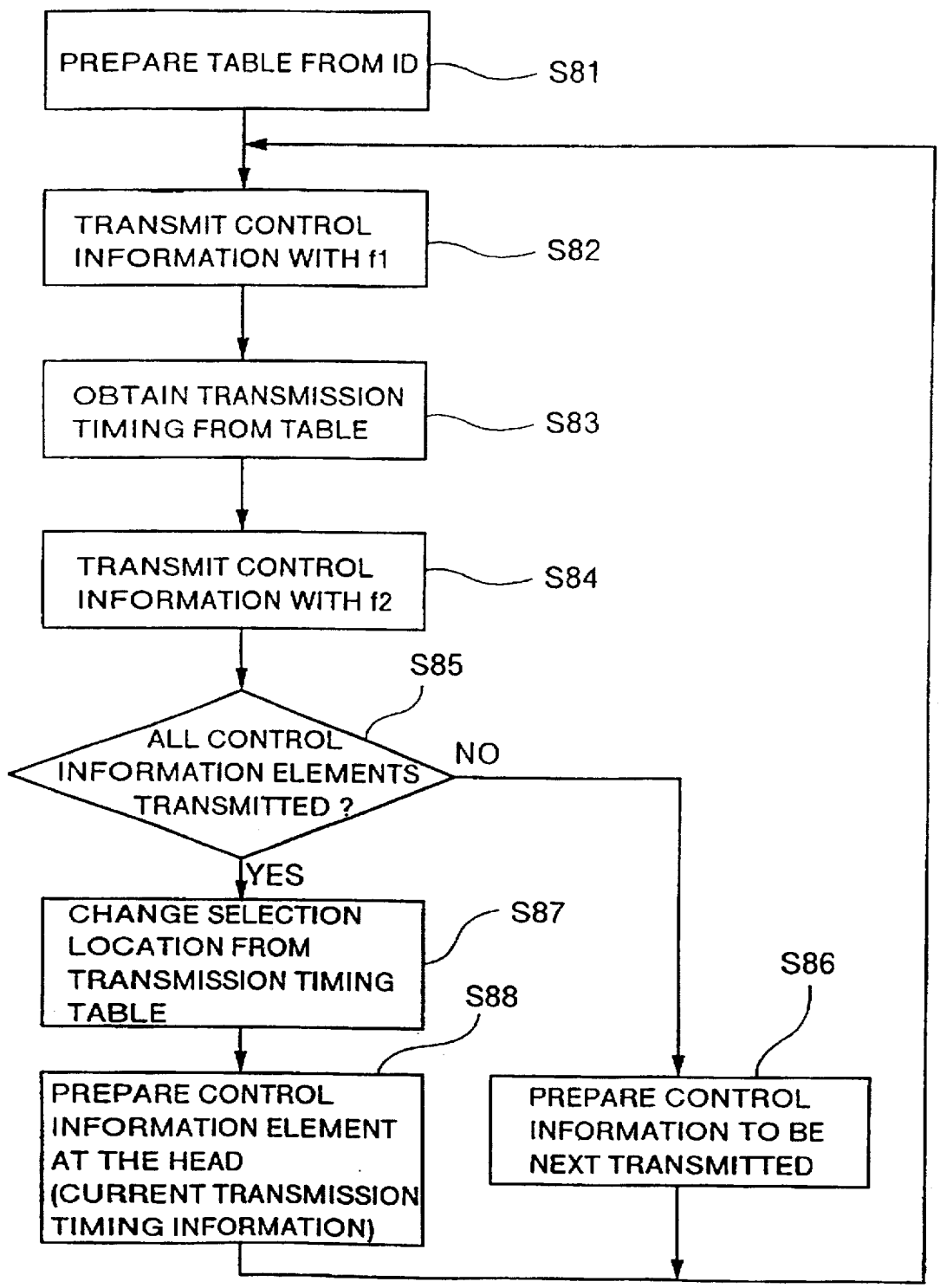
FIG. 16 is a flow chart showing operation of a base station of the digital radiotelephone apparatus according to the fifth embodiment of the present invention.
Figure 17:
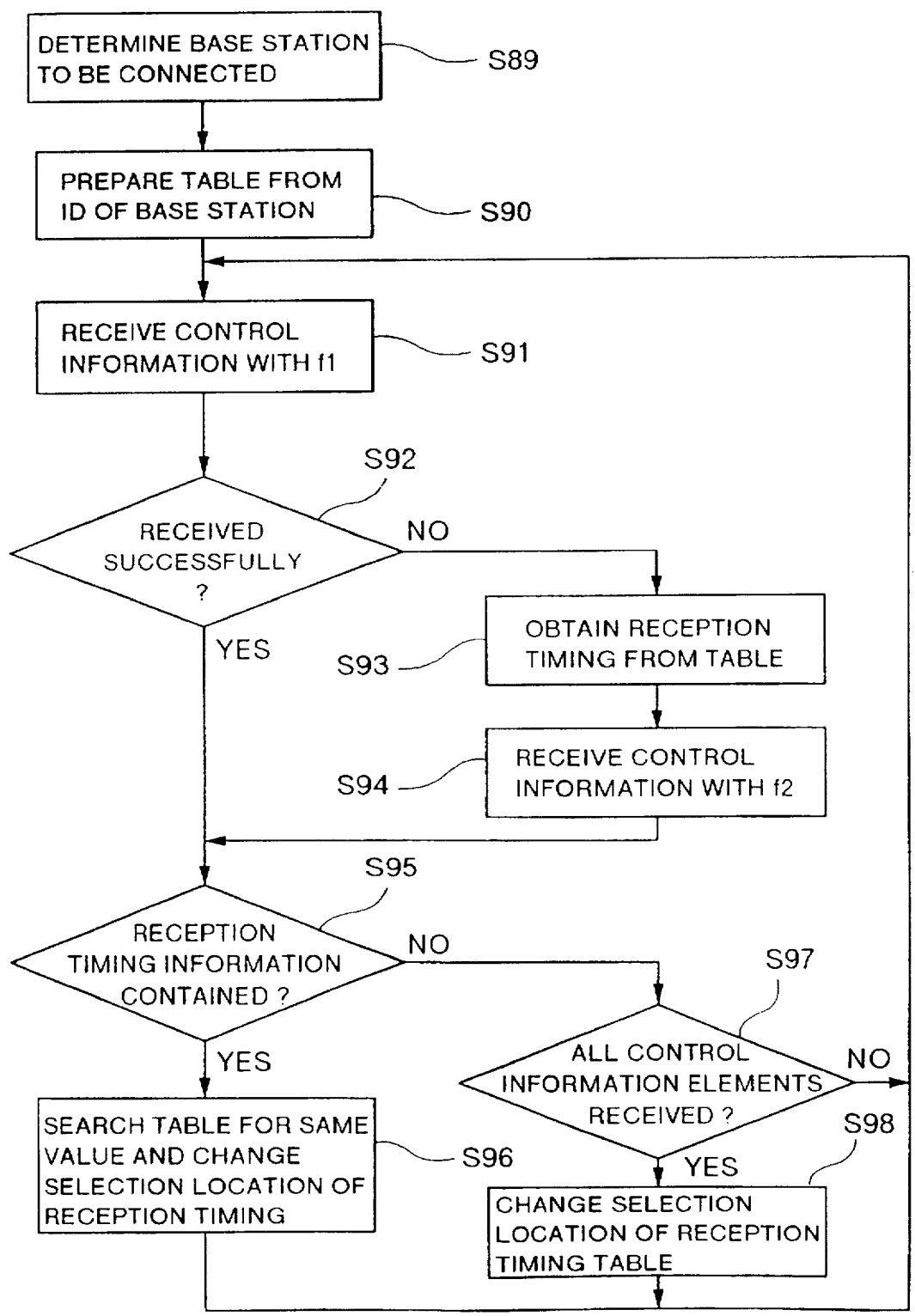
FIG. 17 is a flow chart showing operation of a personal station of the digital radiotelephone apparatus according to the fifth embodiment of the present invention.

Referring not to FIGS. 16 and 17, the interference avoidance operation of the fifth embodiment is described.

First of all, operation of the base station 1010 is described with reference to the flow chart of FIG. 16. It is assumed that the transmission timing information is contained in the control information element at the head.

The second control unit 1004 prepares the transmission timing table on the basis of the identifier (ID) of its own base station and stores it in the fourth memory unit 1006 (step S81). The second control unit 1004 controls the second radio signal processing unit 1002 to transmit the control information with the first frequency f1 (step S82). Thereafter, the second control unit 1004 obtains the transmission timing with the second frequency f2 to the transmission timing with the first frequency f1 from the selection location of the table stored in the fourth memory unit 1006 (step S83). Thus, the second control unit 1004 controls the second radio signal processing unit 1002 to transmit the same control information as that transmitted with the first frequency f1, at the obtained transmission timing with the second frequency f2 (step S84).

When the transmission is finished, it is judged whether all of the control information elements have been transmitted or not (step S85). When all of the control information elements are not transmitted yet, the control information element to be next transmitted is prepared (step S86) and the process is returned to step S82. On the other hand, in step S85, when it is judged that all of the control information elements have been transmitted in the base station 1010, the selection location of the transmission timing table stored in the fourth memory unit 1006 is changed (step S87) and the control information element at the head containing the current transmission timing information is prepared (step S88). Then, the process is returned to step S82.

Operation of the personal station 910 is now described with reference to the flow chart of FIG. 17.

The first control unit 907 first determines the base station 1010 to be connected (step S89) and prepares the transmission timing table from the identifier (ID) of the base station 1010 (step S90). Thus, the first control unit 907 controls the first radio signal processing unit 902 to receive the control information with the first frequency f1 (step S91).

The first control unit 907 judges whether the control information has been received successfully or not (step S92). When the control information has been received successfully, the process proceeds to step S95, while when the reception is failed, the first control unit 907 obtains the reception timing with the second frequency f2 to the reception timing with the first frequency f1 from the selection location of the table stored in the third memory unit 908 (step S93) and controls the first radio signal processing unit 902 to receive the control information at the obtained reception timing with the second frequency f2 (step S94).

Thereafter, when the reception timing information is contained in the received control information (step S95), the first control unit 907 searches the reception timing table stored in the third memory unit 908 for the location in accordance with the transmission timing information and changes the searched location to the selection location of the reception timing (step S96). Thus, the process is returned to step S91. On the other hand, when the transmission timing information is not contained in the control information (step S95), the process proceeds to step S97. The first control unit 907 judges whether all of the control information elements have been received or not (step S97). When the first control unit judges that all of the control information elements are not received, the process is returned to step S91. Further, in step S97, when the first control unit judges that all of the control information elements have been received, the first control unit 907 changes the selection location of the reception timing table stored in the third memory unit 908 (step S98) and the process is returned to step S91.

As described above, in the fifth embodiment, the current transmission timing information is contained in one of the control information transmitted by the base station 1010 to be transmitted to the personal station 910. Even when the personal station 910 cannot receive all of the control information, the personal station 910 can understand the transmission timing of the control information transmitted by the base station 1010 with the second frequency f2 when the personal station can receive only a portion of the control information indicative of the transmission timing of the control information, and the personal station 910 can continue to receive the control information transmitted with the second frequency f2.

(SIXTH EMBODIMENT)

Figure 18:
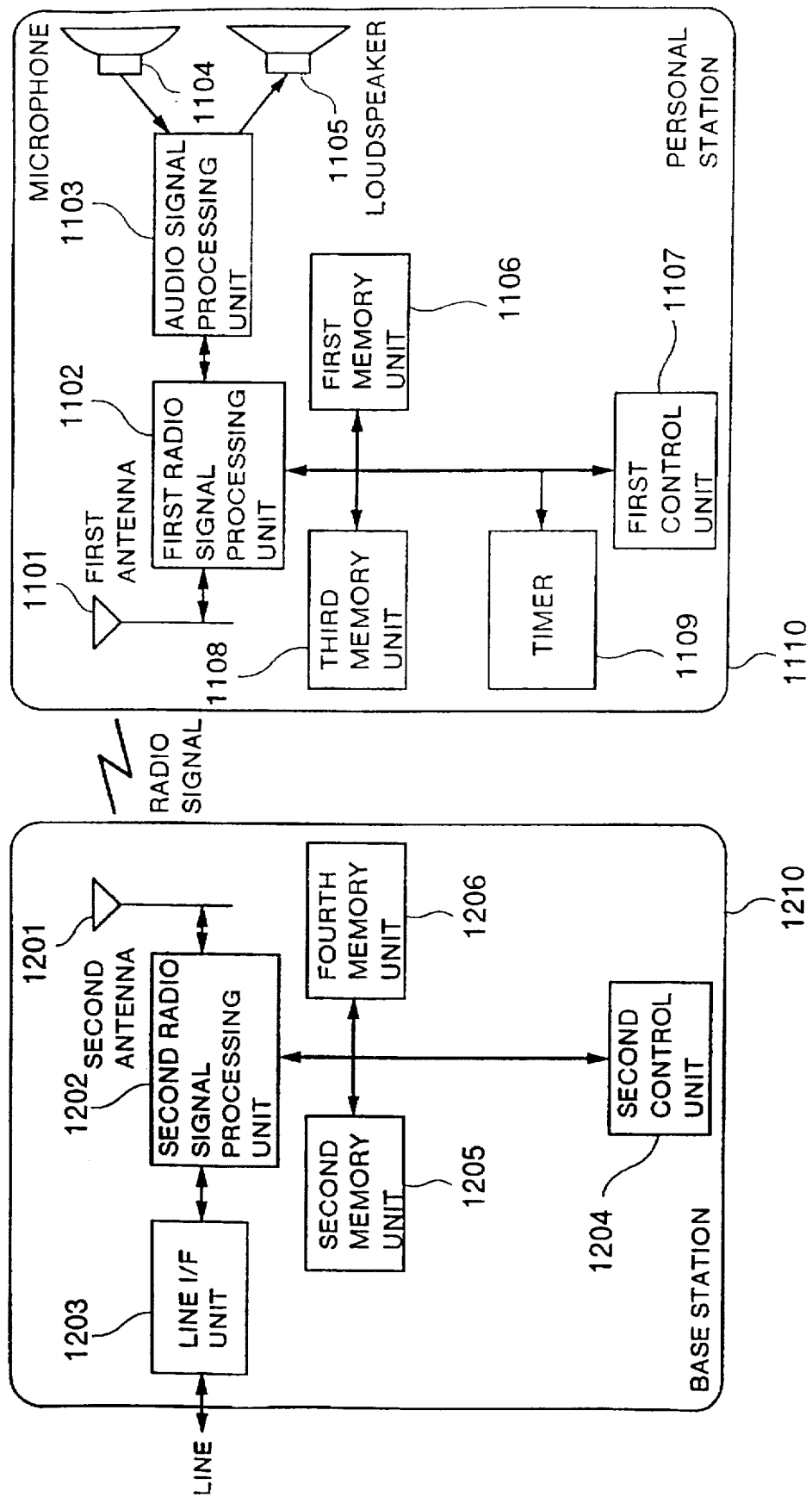
FIG. 18 is a block diagram schematically illustrating a digital radiotelephone apparatus according to a sixth embodiment of the present invention.

FIG. 18 is a block diagram schematically illustrating a digital radiotelephone apparatus according to a sixth embodiment of the present invention. In FIG. 18, numeral 1110 denotes a personal station capable of performing communication by a radio signal in the time division multiple access (TDMA), and numeral 1210 denotes a base station for performing communication with the personal station 1110 by radio.

In the personal station 1110, numeral 1101 denotes a first antenna for transmitting and receiving a radio signal between the base station 1210 and the personal station 1110, numeral 1102 denotes a first radio signal processing unit connected to the first antenna 1101 for modulating and demodulating the radio signal, numeral 1103 denotes an audio signal processing unit connected to the first radio signal processing unit 1102 for processing an audio signal, numeral 1104 denotes a microphone used to input a voice or an audio signal to the audio signal processing unit 1103, numeral 1105 denotes a loudspeaker for producing a voice or an audio signal in accordance with a signal from the audio signal processing unit 1103, numeral 1106 denotes a first memory unit for storing a frequency for receiving control information and the received control information, numeral 1107 denotes a first control unit for controlling the whole personal station 1110, numeral 1108 denotes a third memory unit for storing a table (reception timing table) for determining reception timing of control information, and numeral 1109 denotes a timer. The timer 1109 is set when the personal station 1110 receives the control information element at the head and is timed out when a time required to receive all of the control information elements elapses. Thus, the reception timing is updated.

In the base station 1210, numeral 1201 denotes a second antenna for transmitting and receiving a radio signal between the personal station 1110 and the base station 1210, numeral 1202 denotes a second radio signal processing unit connected to the second antenna 1201 for modulating and demodulating the radio signal, numeral 1203 denotes a line interface (I/F) unit for interfacing a line, numeral 1204 denotes a second control unit for controlling the whole base station 1210, numeral 1205 denotes a second memory unit for storing a frequency for transmitting control information and the control information, and numeral 1206 denotes a fourth memory unit for storing a table (transmission timing table) for determining a transmission timing of the control information.

Figure 19:
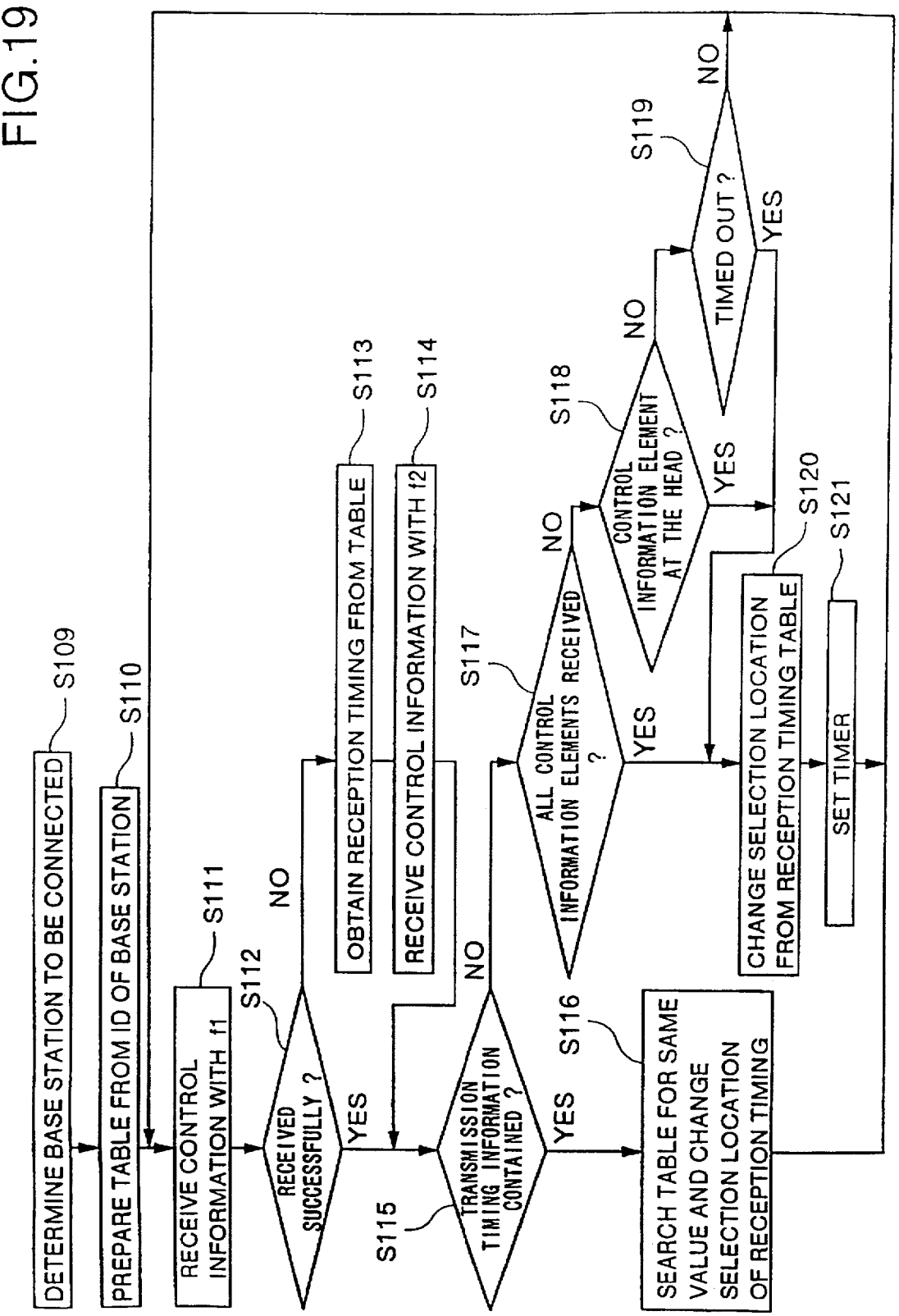
FIG. 19 is a flow chart showing operation of a personal station of the digital radiotelephone apparatus according to the sixth embodiment of the present invention.

Referring now to the flow chart of FIG. 19, the interference avoidance operation of the personal station 1110 of the digital radiotelephone apparatus of the sixth embodiment is described. Operation of the base station 1210 of the digital radiotelephone apparatus of the sixth embodiment is the same as that of the base station 1010 of the fifth embodiment and accordingly description thereof is omitted.

The first control unit 1107 determines the base station 1210 to be connected (step S109) and prepares the reception timing table from the identifier (ID) of the base station 1210. The reception timing table is stored in the third memory unit 1108 (step S110). The first control unit 1107 controls the first radio signal processing unit 1102 to receive the control information with the first frequency f1 (step S111). Then, the first control unit 1107 judges whether the first radio signal processing unit has received the control information successfully or not (step S112). When the unit has received the control information successfully, the process proceeds to step S115, while when the unit fails to receive the control information, the first control unit 1107 obtains the reception timing with the second frequency f2 to the reception timing with the first frequency f1 from the predetermined selection location of the table stored in the third memory unit 1108 (step S113) and controls the first radio signal processing unit 1102 to shift or change the reception frequency to the second frequency f2 and receive the control information at the obtained timing with the second frequency f2 (step S114).

Thereafter, the first control unit 1107 judges from the reception control whether the current transmission timing information is contained in the received control information or not (step S115). When it is contained, the first control unit 1107 searches the table stored in the third memory unit 1108 for the reception timing corresponding to the transmission timing information contained in the control information and changes that location to the predetermined selection location of the reception timing (step S116). Thus, the process is returned to step S111.

Further, in step S115, when the first control unit 1107 judges that the current transmission timing information is not contained in the control information, the first control unit 1107 judges whether all of the control information elements have been received or not (step S117). When the first control unit judges that all of the control information elements have been received, the process proceeds to step S120. On the other hand, in step S117, when the first control unit 1107 judges that all of the control information elements are not received, the first control unit 1107 judges whether the received control information element is the control information element at the head or not (step S118). When the first control unit 1107 judges that it is the control information element at the head, the process proceeds to step S120, while when the first control unit 1107 judges that it is not the control information element at the head, the first control unit 1107 judges whether the timer 1109 is timed out or not (step S119). When it is timed out, the process proceeds to step S120, while when it is not timed out, the process is returned to step S111.

When the first control unit 1107 judges that all of the control information elements have been received in step S117 or that it is the control information element at the head in step S118 or that it is timed out in step S119, the first control unit 1107 changes the predetermined selection location of the reception timing table stored in the third memory unit 1108 (step S120) and sets the timer 1109 (step S121). Thus, the process is returned to step S111.

As described above, in the sixth embodiment, the following four methods are executed exclusively to change the reception timing exactly.

(1) The current transmission timing information is contained in one of the control information and is transmitted from the base station 1210 to the personal station 1110. The personal station 1110 changes the reception timing on the basis of the transmission timing.

(2) The personal station 1110 changes the reception timing when the personal station 1110 receives the control information element at the head in the transmission period of the control information transmitted by the base station 1210.

(3) The personal station 1110 counts the control information elements from the time when the reception timing is changed regardless of reception and impossibility of reception of the control information element and changes the reception timing when the count reaches the number of control information elements constituting the transmission period of the control information.

(4) The personal station 1110 sets to the timer 1109 a time required to receive all of the control information elements constituting the transmission period of the control information when the reception timing is changed and changes the reception timing upon the time out of the timer 1109.

In this manner, the personal station 1110 can recognize the current transmission timing exactly.

(SEVENTH EMBODIMENT)

Figure 20:
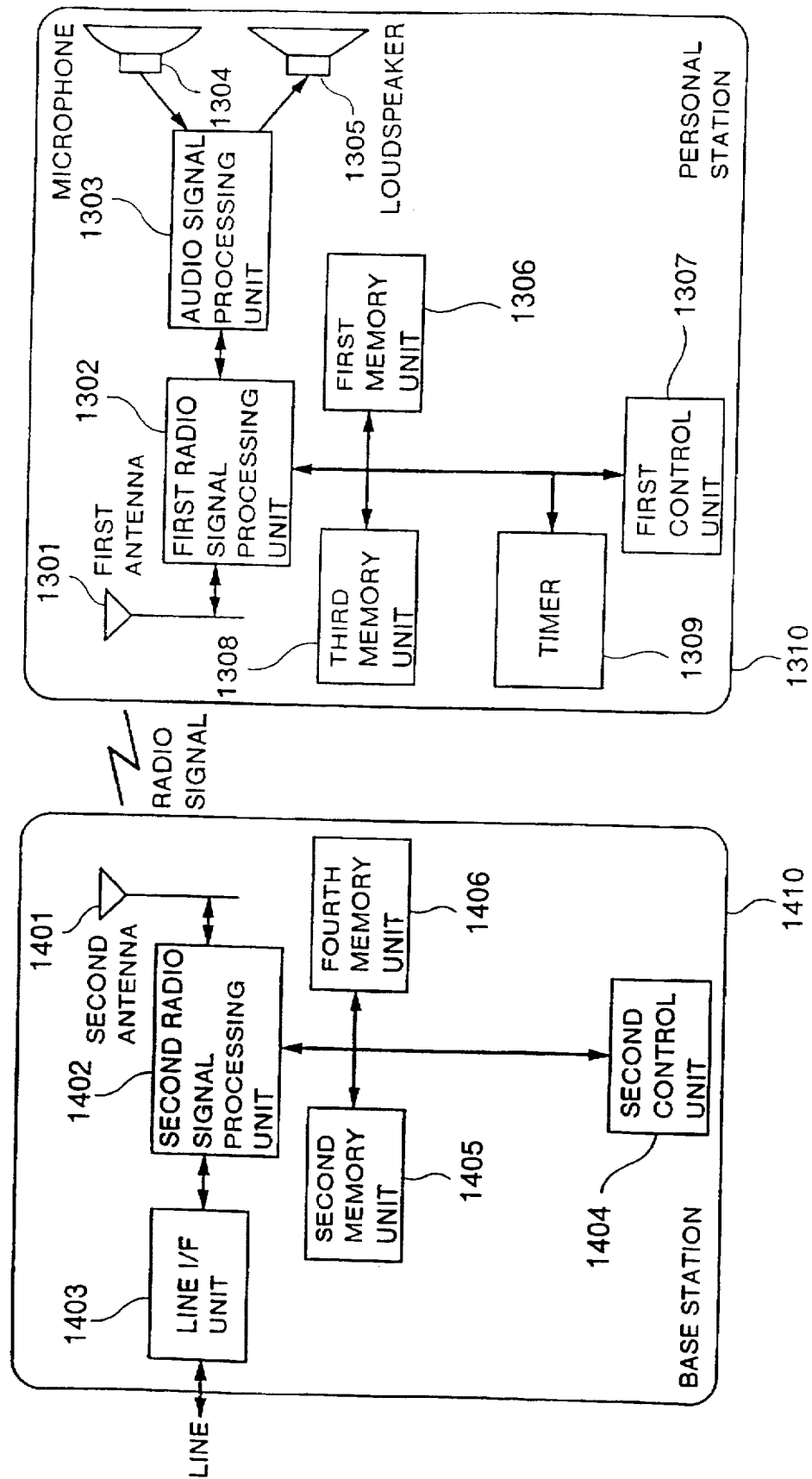
FIG. 20 is a block diagram schematically illustrating a digital radiotelephone apparatus according to a seventh embodiment of the present invention.

FIG. 20 is a block diagram schematically illustrating a digital radiotelephone apparatus according to a seventh embodiment of the present invention. In FIG. 20, numeral 1310 denotes a personal station capable of performing communication by a radio signal in the time division multiple access (TDMA), and numeral 1410 denotes a base station for performing communication with the personal station 1310 by radio.

In the personal station 1310, numeral 1301 denotes a first antenna for transmitting and receiving a radio signal between the base station 1410 and the personal station 1310, numeral 1302 denotes a first radio signal processing unit connected to the first antenna 1301 for modulating and demodulating the radio signal, numeral 1303 denotes an audio signal processing unit connected to the first radio signal processing unit 1302 for processing an audio signal, numeral 1304 denotes a microphone used to input a voice or an audio signal to the audio signal processing unit 1303, numeral 1305 denotes a loudspeaker for producing a voice or an audio signal in response to a signal from the audio signal processing unit 1303, numeral 1306 denotes a first memory unit for storing a frequency for receiving control information and the received control information, numeral 1307 denotes a first control unit for controlling the whole personal station 1310, numeral 1308 denotes a third memory unit for storing a table (reception timing table) for determining reception timing of the control information, and numeral 1309 denotes a timer. The timer 1309 is set when the personal station 1310 receives the control information element at the head and is timed out when a time required to receive all of the control information elements elapses. Thus, the reception timing is updated. Further, the first control unit 1307 prepares the reception timing table from the identifier (ID) of a desired base station 1410 and stores it in the third memory unit 1308. The first control unit 1307 then controls the first radio signal control unit 1302 to receive the radio signal with the frequency stored in the first memory unit 1306. At this time, when the first radio signal processing unit 1302 cannot receive radio signal due to any cause, the first control unit 1307 determines the second reception timing to the first reception timing from the table stored in the third memory unit 1308 and controls the first radio signal processing unit 1302 to receive the radio signal with the second frequency f2 stored in the first memory unit 1306.

Further, in the base station 1410, numeral 1401 denotes a second antenna for transmitting and receiving a radio signal between the personal station 1310 and the base station 1410, numeral 1402 denotes a second radio signal processing unit connected to the second antenna 1401 for modulating and demodulating the radio signal, numeral 1403 denotes a line interface (I/F) unit for interfacing a line, numeral 1404 denotes a second control unit for controlling the whole base station 1410, numeral 1405 denotes a second memory unit for storing a frequency for transmitting control information and the control information, and numeral 1406 denotes a fourth memory unit for storing a table (transmission timing table) for determining transmission timing of the control information. The second control unit 1404 prepares the transmission timing table from the identifier (ID) of the base station 1410 and stores it in the fourth memory unit 1406. The second control unit 1404 controls the second radio signal processing unit 1402 to transmit the control information stored in the second memory unit 1405 as a radio signal with the second frequency f2 stored in the second memory unit 1405 twice at the first and second transmission timings. Other operation is the same as that of the sixth embodiment.

Figure 21:
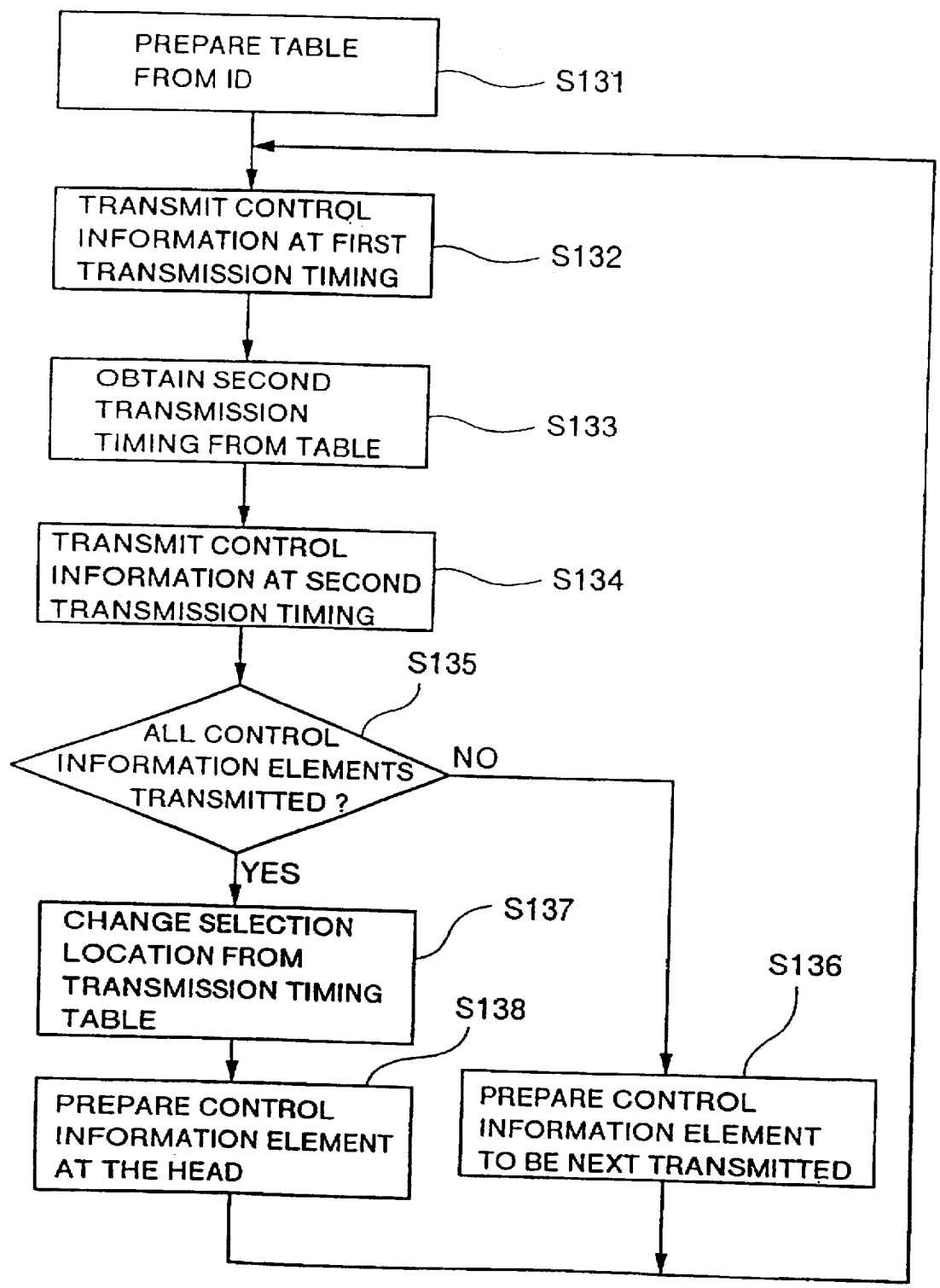
FIG. 21 is a flow chart showing operation of a base station of the digital radiotelephone apparatus according to the seventh embodiment of the present invention.

Referring now to FIGS. 21 and 22, the interference avoidance operation of the seventh embodiment is described.

Operation of the base station 1410 is first described with reference to the flow chart of FIG. 21. It is assumed that the transmission timing information is contained in the control information element at the head.

The second control unit 1404 prepares the transmission timing table from the identifier (ID) and stores it in the fourth memory unit 1406 (step S131). The second control unit 1404 controls the second radio signal processing unit 1402 to transmit the control information with the first transmission timing (step S132).

Thereafter, the second control unit 1404 obtains the second transmission timing to the first transmission timing from the selection location of the table stored in the fourth memory unit 1406 (step S133) and controls the second radio signal processing unit 1402 to transmit the same control information as that transmitted at the first transmission timing, with the same frequency at the second transmission timing (step S134). Thereafter, the second control unit 1404 judges whether all of the control information elements have been transmitted or not (step S135). When all of the control information elements are not transmitted, the second control unit 1404 prepares the control information to be next transmitted and the process is returned to step S132, while when all of the control information elements have been transmitted, the second control unit 1404 changes the selection location from the transmission timing table stored in the fourth memory unit 1406 (step S137) and prepares the control information element at the head containing the current transmission timing information (step S138). The process is returned to step S132.

Operation of the personal station 1310 is now described with reference to the flow chart of FIG. 22. The first control unit 1307 determines the base station 1410 to be connected (step S139) and prepares the reception timing table from the identifier (ID) of the base station 1410. The reception timing table is stored in the third memory unit 1308 (step S140). The first control unit 1307 controls the first radio signal processing unit 1302 to receive the control information at the first reception timing (step S141). When the first radio signal processing unit 1302 receives the control information successfully (step S142), the process proceeds to step S145, while when the first radio signal processing unit 1302 fails to receive the control information, the first control unit 1307 obtains the second reception timing to the first reception timing from the selection location of the table stored in the third memory unit 1308 (step S143) and controls the first radio signal processing unit 1302 to receive the control information at the second reception timing (step S144).

With the above control, when the control information is received, the first control unit 1307 judges whether the current transmission timing information is contained in the received control information or not (step S145). When the first control unit 1307 judges that the transmission timing information is contained, the first control unit 1307 searches the reception timing table for the location having the same value as that the current transmission timing contained in the control information and changes the selection location of the reception timing to that location (step S146). Thus, the process is returned to step S141. On the other hand, in step S145, when the first control unit 1307 judges that the transmission timing information is not contained in the received control information, the first control unit 1307 judges whether all of the control information elements have been received in the personal station 1310 (step S147). When the first control unit 1307 judges that all of the control information elements have been received, the process proceeds to step S150, while when the first control unit 1307 judges that all of the control information elements are not received, the first control unit 1307 judges whether the received control information element is the control information element at the head or not (step S148). When the first control unit 1307 judge that it is the control information element at the head, the process proceeds to step S150. On the other hand, in step S148, when the first control unit 1307 judges that it is not the control information element at the head, the first control unit 1307 judges whether the timer 1309 is timed out or not (step S149). When the first control unit 1307 judges that the timer 1309 is timed out, the process proceeds to step S150, while when the timer 1309 is not timed out, the process is returned to step S141.

When the first control unit 1307 judges that all of the control information elements have been received in step S147 or that the received control information element is the control information element at the head in step S148 or that the timer 1309 is timed out in step S149, the first control unit 1307 changes the predetermined selection location of the reception timing table stored in the third memory unit 1308 (step S150) and sets the timer 1309 (step S151). Thus, the process is returned to step S141.

The first transmission timing at this time is always a fixed timing and the second transmission timing is a delayed timing as compared with the first transmission timing. The base station 1410 determines the delayed second transmission timing on the basis of the same tables prepared by the personal station 1310 and the base station 1410 and dynamically changes the delayed second transmission timing for each transmission period of all the control information elements.

Figure 23A:
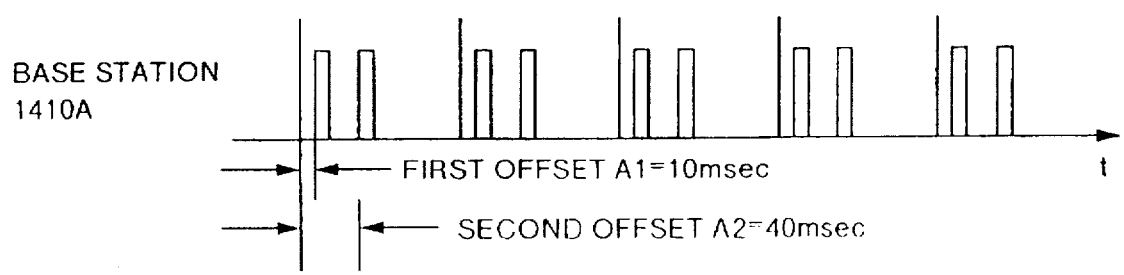
FIGS. 23A and 23B are transmission timing charts of control information of the base station of the digital radiotelephone apparatus according to the seventh embodiment of the present invention.
Figure 23B:
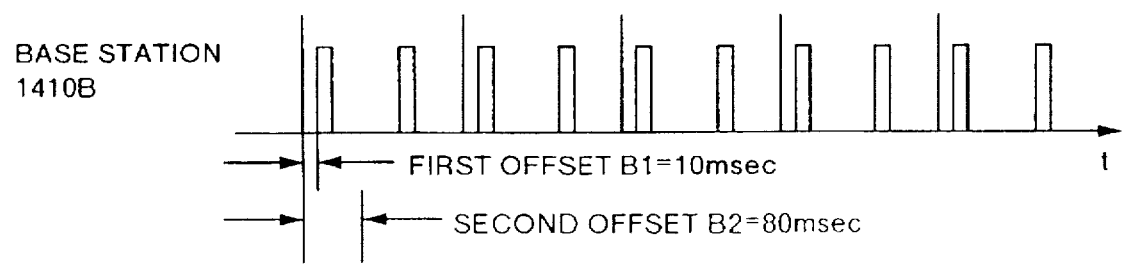
Figure 24:
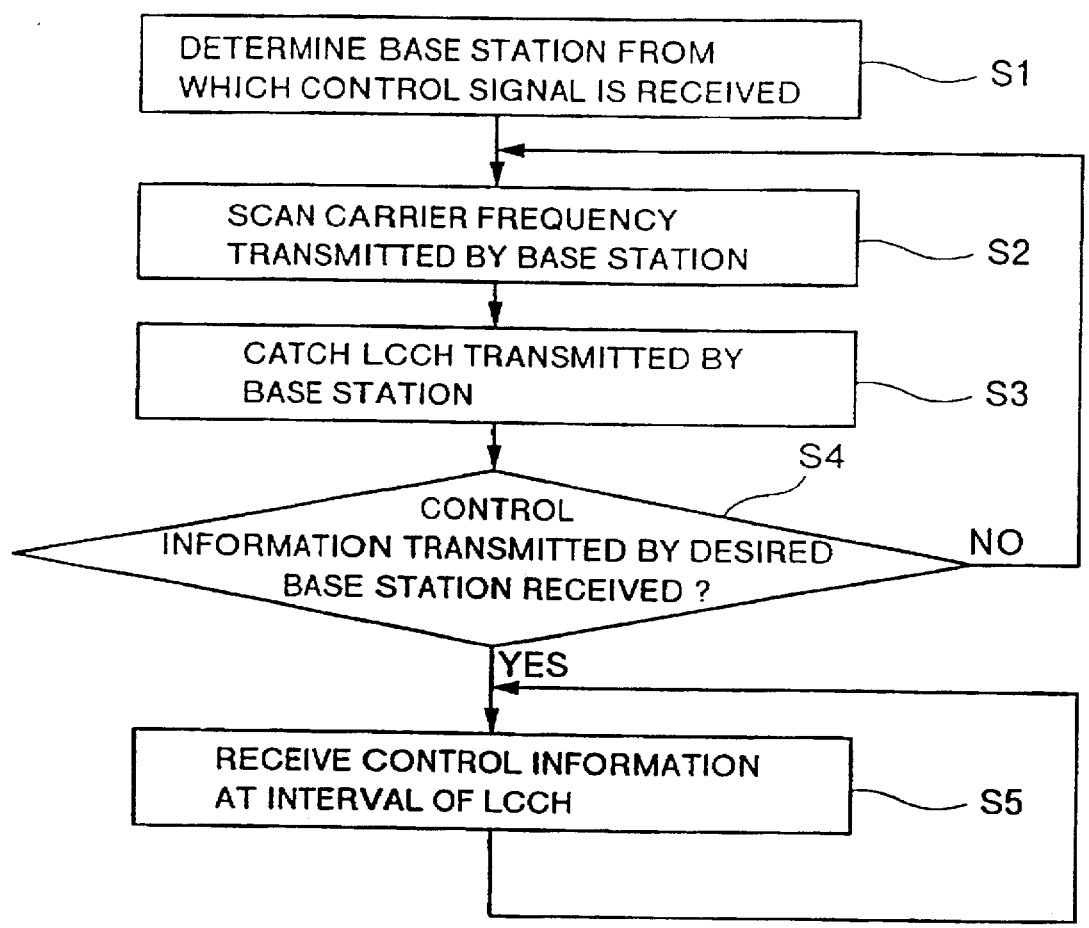
FIG. 24 is a flow chart showing operation in the waiting state of a conventional digital radiotelephone apparatus.
Figure 25:
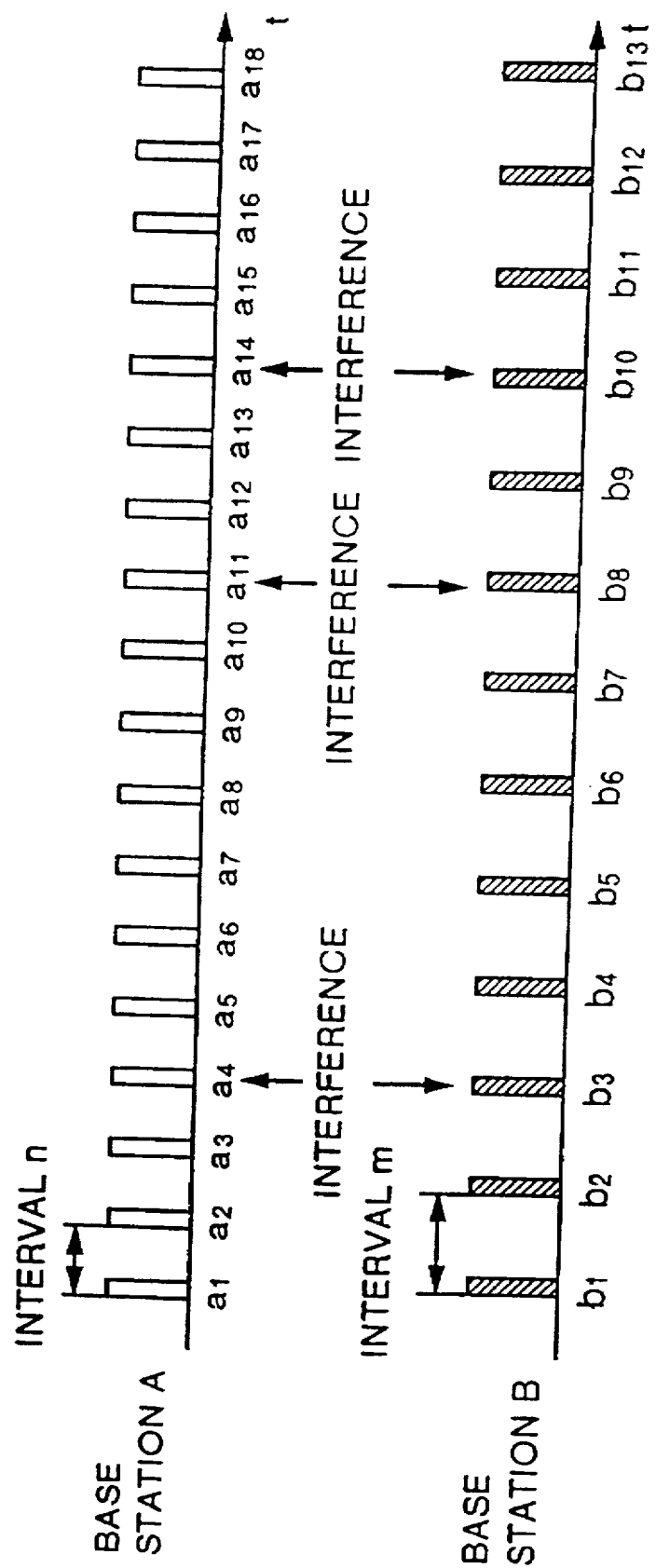
FIG. 25 is a diagram for explaining an example of an interference avoidance method of logical control channels in a conventional digital radiotelephone apparatus.
Figure 26:
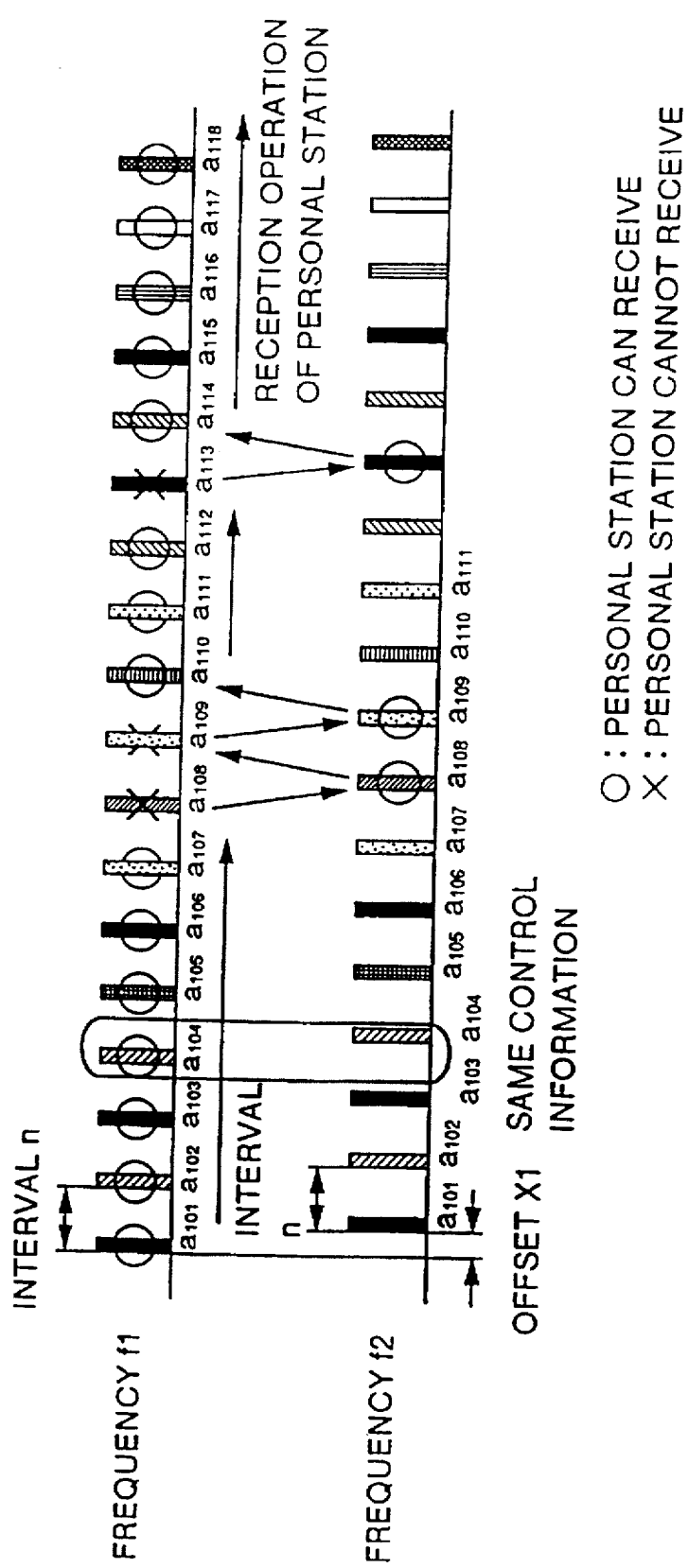
FIG. 26 is a diagram for explaining another example of an interference avoidance method of logical control channels in a conventional digital radiotelephone apparatus.
Figure 27:
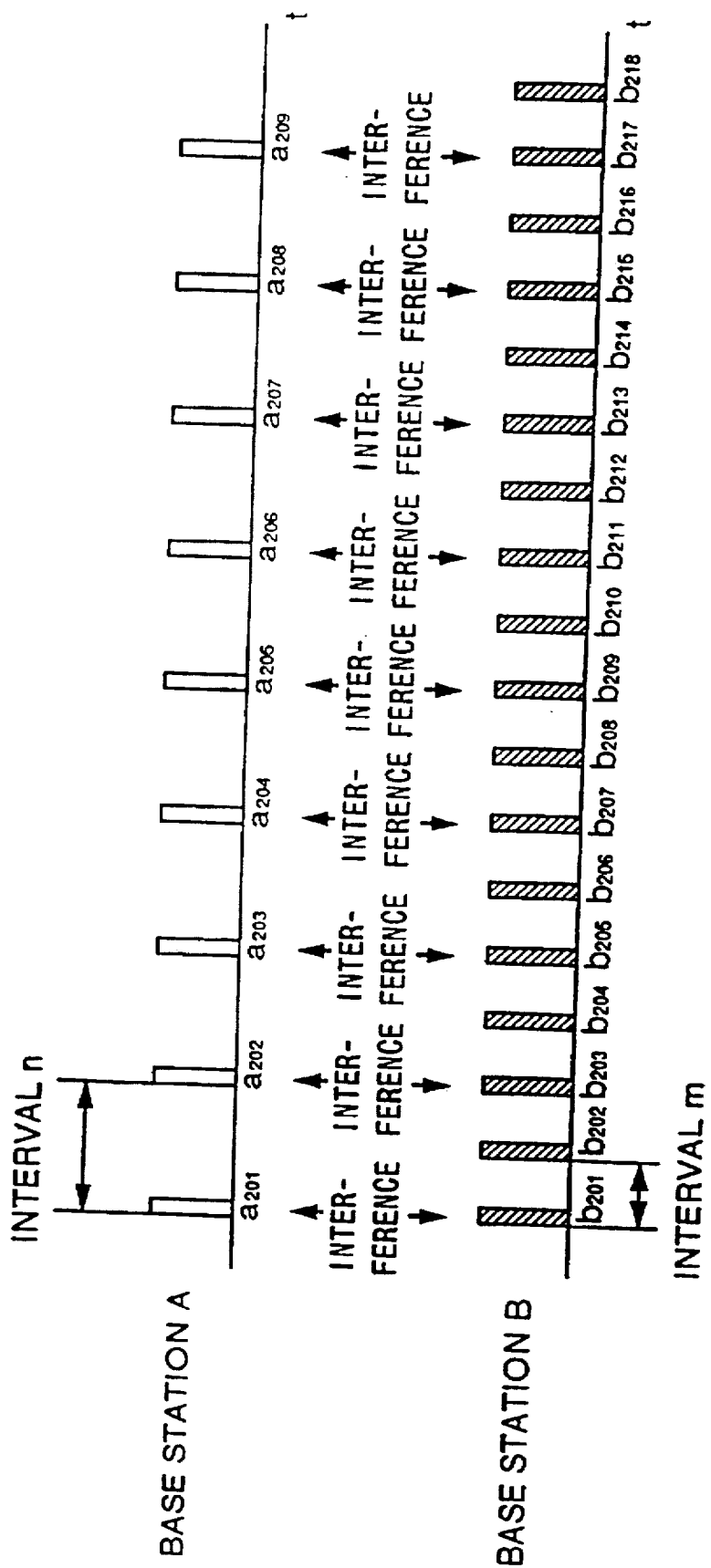
FIG. 27 is a diagram for explaining a problem in case where intervals of the transmission timing of logical control channels in a prior art are small.

As described above, in the seventh embodiment, as shown in FIGS. 23A and 23B, the base 1410 transmits the same control information to the personal station 1310 twice at the different transmission timings with the same frequency, so that the transmission operation is heretofore performed with two frequencies but the same operation can be performed with one frequency in the embodiment to thereby utilize the frequency more effectively.

The base station in the second to seventh embodiments can exhibit sufficient effect in both of the public base station (PBS) and the domestic base station (DBS), while it can be understood that the base station can exhibit remarkable effect particularly in the domestic base station in the same manner as the first embodiment.

What is claimed is:

1. A radiotelephone system comprising:
a base station; and
a mobile station which communicates with said base station in a time divisional multiple access mode,
wherein said base station includes
a transmission unit for transmitting a transmission signal with a transmission frequency in time division, and
a transmission control unit for controlling said transmission unit, and
wherein said transmission control unit controls said transmission unit to transmit said transmission signal at a first transmission timing with a first offset value in time division during a predetermined period, and then to transmit said transmission signal at second transmission timing with a second offset value in time division, said second offset differing from said first offset value.

2. A radiotelephone system according to claim 1,
wherein said mobile station includes
a reception unit for receiving said transmission signal, and
a reception control unit for controlling said reception unit, and
wherein said reception control unit controls said reception unit to receive said transmission signal at a first reception timing corresponding to said first transmission timing with said first offset value during said predetermined period, and then to receive said transmission signal at second reception timing corresponding to said second transmission timing with said second offset value.

3. A radiotelephone system according to claim 2, wherein said base station is a public base station.

4. A radiotelephone system according to claim 2, wherein said base station is a base unit for a cordless telephone apparatus, and said mobile station is a mobile unit for said cordless telephone apparatus.

5. A radiotelephone system according to claim 1, wherein said radiotelephone system is a digital radiotelephone system.

6. A radiotelephone system comprising:
a base station; and
a mobile station which communicates with said base station in a time divisional multiple access mode,
wherein said base station includes
a transmission unit for transmitting first and second control information at a first transmission frequency in time division, and for transmitting said first and second control information at a second transmission frequency in time division, and
a transmission control unit for controlling said transmission unit, and wherein said transmission control unit controls said transmission unit to transmit said first and second control information at said first transmission frequency successively, to transmit said first control information at said second transmission frequency with a first delay time, which corresponds to a first offset value, after transmission of said first control information at said first transmission frequency starts, and to transmit said second control information at said second transmission frequency with a second delay time, which corresponds to a second offset value, after transmission of said second control information at said first transmission frequency starts, said second offset value differing from said first offset value.

7. A radiotelephone system according to claim 6,
wherein said mobile station includes
 a reception unit for receiving said first and second control information, and
 a reception control unit for controlling said reception unit,
wherein said reception control unit controls said reception unit to receive said first and second control information at a first reception frequency corresponding to said first transmission frequency,
wherein, if said first control information cannot be received in said reception unit, said reception control unit controls said reception unit to receive said first control information at a first reception timing, which corresponds to said first offset value, and at a second reception frequency corresponding to said second transmission frequency, and
wherein, if said second control information cannot be received by said reception unit, said reception control unit controls said reception unit to receive said second control information at a second reception timing, which corresponds to said second offset value, and at said second reception frequency.

8. A radiotelephone system according to claim 7, wherein said base station is a public base station.

9. A radiotelephone system according to claim 7, wherein said base station is a base unit for a cordless telephone apparatus, and said mobile station is a mobile unit for said cordless telephone apparatus.

10. A digital radiotelephone system according to claim 6, wherein said radiotelephone system is a digital radiotelephone system.

11. A radiotelephone system comprising:
a base station; and
a mobile station which communicates with said base station in a time divisional multiple access mode,
wherein said base station includes
 a transmission unit for transmitting first and second control information at a first transmission frequency in time division, and for transmitting said first and second control information at a second transmission frequency in time division,
 a transmission timing storage unit for storing a first transmission timing for said first control information transmitted at said second transmission frequency and a second transmission timing for said second control information transmitted at said second transmission frequency, said first transmission timing being obtained, based on a predetermined algorithm, for transmission of said first control information at said first transmission frequency and said second transmission timing being obtained, based on said predetermined algorithm, for transmission of said second control information at said first transmission frequency, and
 a transmission control unit for controlling said transmission unit,
wherein said transmission control unit controls said transmission unit to transmit said first and second control information at said first transmission frequency successively,
wherein, after transmission of said first control information at said first transmission frequency starts, said transmission control unit controls said transmission unit to read out said first transmission timing from said transmission storage unit and then to transmit said first control information at said read-out first transmission timing and at said second transmission frequency, and
wherein, after transmission of said second control information at said first transmission frequency starts, said transmission control unit controls said transmission unit to read out said second transmission timing from said transmission storage unit, and then to transmit said second control information at said read-out second transmission timing and at said second transmission frequency.

12. A radiotelephone system according to claim 11,
wherein said mobile station includes
 a reception unit for receiving said first and second control information transmitted from said base station,
 a reception timing storage unit for storing a first reception timing corresponding to said first transmission timing and a second reception timing corresponding to said second transmission timing, and
 a reception control unit for controlling said reception unit,
wherein said reception control unit controls said reception unit to receive said first and second control information at a first reception frequency corresponding to said first transmission frequency,
wherein, if said first control information cannot be received by said reception unit, said reception control unit controls said reception unit to receive said first control information at said first reception timing, which is read out from said reception timing storage unit, and at a second reception frequency corresponding to said second transmission frequency, and
wherein, if said second control information cannot be received by said reception unit, said reception control unit controls said reception unit to receive said second control information at said second reception timing, which is read out from said reception timing storage unit, and at said second reception frequency.

13. A radiotelephone system according to claim 12, wherein said base station is a public base station.

14. A radiotelephone system according to claim 12, wherein said base station is a base unit for a cordless telephone apparatus, and said mobile station is a mobile unit for said cordless telephone apparatus.

15. A radiotelephone system according to claim 11, wherein said radiotelephone system is a digital radiotelephone system.

16. A radiotelephone system comprising:
a base station; and
a mobile station which communicates with said base station in a time divisional multiple access mode,
wherein said base station includes a transmission unit for transmitting first and second control information at a first transmission frequency in time division, and for transmitting said first and second control information at a second transmission frequency in time division, a transmission timing storage unit for storing a first transmission timing for said first control information transmitted at said second transmission frequency and a second transmission timing for said second control information transmitted at said second transmission frequency, said first transmission timing being obtained, based on an identifier of said base station, for transmission of said first control information at said first transmission frequency, and said second transmission timing being obtained, based on said identifier, for transmission of said second control information at said first transmission frequency, and a transmission control unit for controlling said transmission unit, wherein, said transmission control unit controls said transmission unit to transmit said first and second control information at said first transmission frequency successively, wherein, after transmission of said first control information at said first transmission frequency starts, said transmission control unit controls said transmission unit to read out said first transmission timing, and then to transmit said first control information at said read-out first transmission timing and at said second transmission frequency, and wherein, after transmission of said second control information at said first transmission frequency starts, said transmission control unit controls said transmission unit to read out said second transmission timing, and then to transmit said second control information at said read-out second transmission timing and at said second transmission frequency.

17. A radiotelephone system according to claim 16, wherein said mobile station includes a reception unit for receiving said first and second control information transmitted from said base station, a reception timing determination unit for obtaining a first reception timing and a second reception timing based on said identifier of said base station, said first reception timing corresponding to said first transmission timing and said second reception timing corresponding to said second transmission timing, a reception timing storage unit for storing said obtained first and second reception timings, and a reception control unit for controlling said reception unit, wherein said reception control unit controls said reception unit to receive said first and second control information at a first reception frequency corresponding to said first transmission frequency, wherein, if said first control information cannot be received by said reception unit, said reception control unit controls said reception unit to receive said first control information at said first reception timing, which is read out from said reception timing storage unit, and at a second reception frequency corresponding to said second transmission frequency, and wherein, if said second control information cannot be received by said reception unit, said reception control unit controls said reception unit to receive said second control information at said second reception timing, which is read from said reception timing storage unit, and at said second reception frequency.

18. A radiotelephone system according to claim 17, wherein said base station is a public base station.

19. A radiotelephone system according to claim 17, wherein said base station is a base unit for a cordless telephone apparatus, and said mobile station is a mobile unit for said cordless telephone apparatus.

20. A radiotelephone system according to claim 16, wherein said radiotelephone system is a digital radiotelephone system.

21. A radiotelephone system comprising:

a base station; and a mobile station which communicates with said base station in a time divisional multiple access mode, wherein said base station includes a transmission unit for transmitting first and second control information at a first transmission frequency in time division, and for transmitting said first and second control information at a second transmission frequency in time division, a transmission timing storage unit for storing a first transmission timing of said first control information transmitted at said second transmission frequency and a second transmission timing of said second control information transmitted at said second transmission frequency, said first transmission timing being obtained, based on an identifier of said base station, for transmission of said first control information at said first transmission frequency, and said second transmission timing being obtained, based on said identifier, for transmission of said second control information at said first transmission frequency, and a transmission control unit for controlling said transmission unit, wherein said transmission control unit controls said transmission unit to include said first transmission timing in said first control information and to include said second transmission timing in said second control information, wherein said transmission control unit controls said transmission unit to transmit said first and second control information at said first transmission frequency successively, wherein, after transmission of said first control information at said first transmission frequency starts, said transmission control unit controls said transmission unit to read out said first transmission timing from said transmission storage unit, and then to transmit said first control information at said read-out first transmission timing and at said second transmission frequency, and wherein, after transmission of said second control information at said first transmission frequency starts, said transmission control unit controls said transmission unit to read out said second transmission timing from said transmission storage unit, and then to transmit said second control information at said read-out second transmission timing and at said second transmission frequency.

22. A radiotelephone system according to claim 21, wherein said mobile station includes a reception unit for receiving said first and second control information transmitted from said base station, a reception timing determination unit for obtaining a first reception timing and a second reception timing based on said identifier of said base station, said first reception timing corresponding to said first transmission timing and said second reception timing corresponding to said second transmission timing, a reception timing storage unit for storing said obtained first and second reception timings; and a reception control unit for controlling said reception unit, wherein said reception control unit controls said reception unit to receive said first and second control information at a first reception frequency corresponding to said first transmission frequency, wherein, if said first transmission timing included in said first control information can be received by said reception unit, said reception control unit controls said reception unit to read out said first reception timing from said reception timing storage unit, and then if said first control information cannot be received by said reception unit, said reception control unit controls said reception unit to receive said first control information at said read-out first reception timing and at a second reception frequency corresponding to said second transmission frequency, and wherein, if said second transmission timing included in said second control information can be received by said reception unit, said reception control unit controls said reception unit to read out said second reception timing from said reception timing storage unit, and then if said second control information cannot be received by said reception unit, said reception control unit controls said reception unit to receive said second control information at the read-out second reception timing and at said second reception frequency.

23. A radiotelephone system according to claim 22, wherein said base station is a public base station.

24. A radiotelephone system according to claim 22, wherein said base station is a base unit for a cordless telephone apparatus, and said mobile station its a mobile unit for said cordless telephone apparatus.

25. A radiotelephone system according to claim 21, wherein said mobile station includes a reception unit for receiving said first and second control information transmitted from said base station, a reception timing determination unit for obtaining first to third reception timings based on said identifier of said base station, a reception timing storage unit for storing said obtained first to third reception timings, and a reception control unit for controlling said reception unit, wherein, if said first transmission timing included in said first control information cannot be received at said first reception timing and at a first reception frequency corresponding to said first transmission frequency by said reception unit, and if said second transmission timing included in said second control information cannot be received at said second reception timing and at a second reception frequency corresponding to said second transmission frequency by said reception unit and a constant time period has passed, said reception control unit controls said reception unit to receive said first control information at said first reception frequency and at said third reception timing, which is read out from said reception timing storage unit, in place of said first reception timing.

26. A radiotelephone system according to claim 25, wherein said base station is a public base station.

27. A radiotelephone system according to claim 25, wherein said base station is a base unit for a cordless telephone apparatus, and said mobile station is a mobile unit for said cordless telephone apparatus.

28. A radiotelephone system according to claim 21, wherein said radiotelephone system is a digital radiotelephone system.

29. A radiotelephone system comprising:

a base station; and a mobile station which communicates with said base station in a time divisional multiple access mode, wherein said base station includes a transmission unit for transmitting control information at a transmission frequency in time division, and a transmission control unit for controlling said transmission unit to transmit said control information at a first transmission timing in time division and to transmit said control information at a second transmission timing which differs from said first transmission timing in time division.

30. A radiotelephone system according to claim 29, wherein said mobile station includes a reception unit for receiving said control information transmitted from said base station, and a reception control unit for controlling said reception unit to receive said control information at a second reception timing corresponding to said second transmission timing if said control information cannot be received at a first reception timing corresponding to said first transmission timing by said reception unit.

31. A radiotelephone system according to claim 30, wherein said base station is a public base station.

32. A radiotelephone system according to claim 30, wherein said base station is a base unit for a cordless telephone apparatus, and said mobile station is a mobile unit for said cordless telephone apparatus.

33. A radiotelephone system according to claim 30, wherein said transmission control unit in said mobile station controls said transmission unit to obtain said first and second transmission timings based on an identifier of said base station, to transmit said control information at said obtained first transmission timing in time division after including said obtained first transmission timing in said control information, and to transmit said control information at said obtained second transmission timing in time division after including said obtained second transmission timing in said control information.

34. A radiotelephone system according to claim 33, wherein said reception control unit in said mobile station controls said reception unit to obtain a first reception timing, which corresponds to said first transmission timing, and a second reception timing, which corresponds to said second transmission timing, based on said identifier of said base station, wherein, if said first transmission timing included in said control information can be received, said reception control unit controls said reception unit to receive said control information at said first reception timing, and wherein, if said second transmission timing included in said control information can be received, said reception control unit controls said reception unit to receive said control information at said second reception timing.

35. A radiotelephone system according to claim 34, wherein said base station is a public base station.

36. A radiotelephone apparatus according to claim 34, wherein said base station is a base unit for a cordless telephone apparatus, and said mobile station is a mobile unit for said cordless telephone apparatus.

37. A radiotelephone system according to claim 33, wherein said mobile station includes
- a reception unit for receiving said control information transmitted from said base station,
- a reception timing determination unit for obtaining first to third reception timings based on said identifier of said base station,
- a reception timing storage unit for storing said obtained first to third reception timings, and
- a reception control unit for controlling said reception unit, and wherein, if said first transmission timing included in said control information cannot be received at said first reception timing, and if said second transmission timing included in said control information cannot be received at said second reception timing and a constant time period has passed, said reception control unit controls said reception unit to receive said control information at said third reception timing, which is read out from said reception timing storage unit, in place of said first reception timing.

38. A radiotelephone system according to claim 37, wherein said base station is a public base station.

39. A radiotelephone system according to claim 37, wherein said base station is a base unit for a cordless telephone apparatus, and said mobile station is a mobile unit for said cordless telephone apparatus.

40. A radiotelephone system according to claim 29, wherein said radiotelephone system is a digital radiotelephone system.

* * * * *